United States Patent [19]
Schipper et al.

[11] Patent Number: 5,825,328
[45] Date of Patent: Oct. 20, 1998

[54] PRECISE INVERSE DIFFERENTIAL CORRECTIONS FOR LOCATION DETERMINATION

[75] Inventors: John F. Schipper, Palo Alto; Peter Loomis, Sunnyvale, both of Calif.

[73] Assignee: Trimble Navigation Limited, Sunnyvale, Calif.

[21] Appl. No.: 865,480

[22] Filed: May 29, 1997

Related U.S. Application Data

[63] Continuation-in-part of Ser. No. 792,841, Jan. 11, 1997.
[51] Int. Cl.$^6$ .............................. H04B 7/185; G01S 5/02
[52] U.S. Cl. ........................... 342/357; 342/457; 701/214
[58] Field of Search ................................. 342/357, 457; 701/214, 215

[56] References Cited

U.S. PATENT DOCUMENTS 5,680,140  10/1997  Loomis .................................... 342/357

Primary Examiner—Theodore M. Blum
Attorney, Agent, or Firm—Wagner, Murabito & Hao

[57] ABSTRACT

A method for determining J location fix coordinates, such as (x,y,z,b) for J=2–4, for a selected location, such as a mobile station location, with increased accuracy, for a satellite-based or ground-based location determination (LD) system such as GPS, GLONASS or LORAN. Pseudorange corrections for the pseudorange values measured at the reference station approximately at an observation time t' are used to correct the pseudorange values measured at the selected location. Location fix coordinates are computed from the pseudorange values at the selected location or at the reference station, using an exact, invertible transformation T(t') between the J location fix coordinates and J pseudorange values. Information including the location fix coordinates is transmitted from one station to another with a reduced or minimal number of information bytes and with small dynamic ranges. Locations fix coordinates, as corrected using the pseudorange corrections, for the selected location are computed at the selected location, at the reference station or at a supplemental data processor, using the transformation T(t') and/or its inverse.

20 Claims, 6 Drawing Sheets

PRECISE INVERSE DIFFERENTIAL CORRECTIONS FOR LOCATION DETERMINATION

FIELD OF THE INVENTION

This is a continuation-in-part of another application, U.S. Ser. application No. 08/792,841 filed Nov. 1, 1997. This invention relates to enhancement of the accuracy of spatial location coordinates and clock bias provided by a location determination system, such as GPS, GLONASS or Loran.

BACKGROUND OF THE INVENTION

Development of location determination (LD) systems, such as the Global Positioning System (GPS) and the LORAN system in the United States and the Global Orbiting Navigational Satellite System (GLONASS) in the former Soviet Union, has allowed location coordinates and/or observation time of an object on or near the Earth to be determined with improved accuracy. Under ordinary circumstances, these location coordinates can be determined with an inaccuracy of no more than 30 meters. In order to further improve the accuracy, differential corrections for the LD system have been introduced and used. Differential corrections can provide location fix coordinates with inaccuracies as low as a few meters, or lower in some instances. Implementation of differential corrections requires that an LD signal reference station, whose location coordinates are known (preferably to within a fraction of a meter) be provided to receive the normal LD signals from an LD signal source. The reference station compares its known pseudoranges, based on known location fix coordinates for the reference station and for the LD signal sources, with the pseudoranges computed using the acceptable LD signals received from each visible LD signal source. The difference, called a pseudorange correction, between the known pseudorange and the computed pseudorange is transmitted for each visible LD signal source, along with an indicium that identifies each LD signal source used. A mobile station or other selected location ("user location") near the reference station receives and uses the pseudorange corrections to correct its own LD signal-determined pseudorange values for each acceptable LD signal. The pseudorange corrections must be received and processed at the user location.

Several problems are presented here. First, this process assumes that the pseudorange corrections, determined at the reference station, are also valid at the user location, which may be spaced apart from the reference station by a distance of the order of 100 kilometers (km). This assumption may be unjustified if the local ionosphere and/or the local troposphere is undergoing relatively rapid change with time, or if the multipath signals that contribute to the pseudoranges at the reference station and at the user location are substantially different.

Second, this process requires that the pseudorange corrections be transmitted to and used at the user location. In some situations, it may be more convenient to transmit the user location pseudorange information to the reference station or to a supplemental data processor and to allow the recipient to do the processing and subsequent analysis.

Third, the variables actually determined are not the pseudoranges but the location coordinates themselves. A single central station and associated GPS reference station may service a large number of mobile users, each with a different location in the field. The pseudorange corrections for each user location vary with the actual location in the field. In a tracking application, for example, the GPS-determined location of a mobile user is determined and transmitted to a central station for accumulating a time history of the user's location and for subsequent analysis, using the corrections determined by a GPS reference station at or near the central station. In a mapping application, a sequence of LD signal-determined locations is computed and stored in a file in a (mobile) user's LD signal receiver/processor. This file is stored at the central station, to use the corrections determined by a reference station at or near the central station and to develop a corrected set of locations for sites that were earlier mapped by the user.

Measurements and use of pseudoranges are fundamental to LD signal-assisted determination of location and/or time coordinates. Until recently, only a modest number of patents have disclosed procedures that work directly with the pseudorange values. Pseudorange measurements and their applications are discussed by Hurd in U.S. Pat. No. 4,578,678, by Keegan in U.S. Pat. No. 4,972,431, by Counselman in U.S. Pat. Nos. 4,809,005 and 4,894,662, by Allison in U.S. Pat. No. 5,148,179, by Durboraw in U.S. Pat. No. 5,266,958, by Mueller et al in U.S. Pat. No. 5,323,322, by Kyrtsos et al in U.S. Pat. Nos. 5,359,521, 5,375,059, 5,390,124, 5,390,125, 5,430,654, 5,430,657, 5,438,517 and 5,490,073, by Sheynblat in U.S. Pat. Nos. 5,436,632, 5,450,448 and 5,563,917, by Babu in U.S. Pat. No. 5,451,964, by Dennis in U.S. Pat. No. 5,467,282, by Hatch in U.S. Pat. No. 5,471,217, by Loomis in U.S. Pat. Nos. 5,477,458 and 5,495,257, by Lennen et al in U.S. Pat. No. 5,515,057, by Gildea in U.S. Pat. No. 5,523,761, by King in U.S. Pat. No. 5,525,999, by Stove in U.S. Pat. No. 5,563,602, by Schipper in U.S. Pat. No. 5,577,122, and by McBurney in U.S. Pat. No. 5,590,043.

The prior art in this area usually measures pseudoranges at a single station and applies complex analysis to determine as much as possible from these single reference station measurements. Where differential corrections of pseudoranges are to be used in a region surrounding a reference station, a procedure must be found to allow consistent and efficient sharing of these corrections and to provide consistent determination of the corresponding spatial location coordinate and clock bias corrections for a reference station and one or more mobile stations that communicate with the reference station.

What is needed is a system for exactly determining uncorrected location fix coordinates or coordinate differentials from uncorrected pseudorange measurements or pseudorange differentials made at a selected user location or at a reference station, for transmitting and/or receiving this information in a minimum number of bytes (as uncorrected location fix coordinates or coordinate differentials), for redetermining the equivalent uncorrected pseudoranges or pseudorange corrections at the recipient's location, for applying the pseudorange corrections appropriate for the user location, and for determining corrected location coordinates for the user location. Preferably, the pseudorange corrections should be based on the selected location, not necessarily on the location of a reference station used for initially determining these corrections. Preferably, this method should require only one-way transmission of location fix coordinate data corresponding to pseudorange data, should allow correction of pseudorange values at the reference station or at the user location or at a supplemental data processor, and should minimize the amount of data transmitted for this purpose. Preferably, this method should provide an exact, rather than approximate, relationship between pseudorange measurements at the user location and the location fix coordinates for the user location.

SUMMARY OF THE INVENTION

These needs are met by the invention, which provides methods for converting uncorrected location coordinates for a selected location, such as a (mobile) user station location, into location coordinates that are corrected for pseudorange differences, based on observations of these differences at a reference station having a known location. In a first embodiment of the method, location determination (LD) signals from M LD signal sources (M≧2) are received at each of a selected location and an LD signal reference station, and the spatial location and time coordinates for each location are determined exactly from the measured LD signal pseudoranges. LD signal pseudorange corrections and other observable errors are represented by an M×1 column pseudorange corrections matrix or vector $PRC(t')=PR(t_c)_{cor} - PR(t')$, where the entries $PR(t_c;jm)_{cor}$ (m=1, ..., M) of the matrix $PR(t_c)_{cor}$ represent the corrected pseudorange signals for a nominal solution of an assembly of such signals received at a known location on or near the Earth's surface from each of M LD signal sources.

The entries or matrix elements of the pseudorange corrections matrix PRC(t') that produce corrected location fix coordinates $(x_c(t), y_c(t), z_c(t), b_c(t))$ are determined by, or can be used to determine, the corresponding location fix coordinate differences $(\Delta x(t'), \Delta y(t'), \Delta z(t'), \Delta b(t'))=(x_c(t)-x'(t'), y_c(t)-y'(t'), z_c(t)-z'(t'), b_c(t)-b'(t'))$ between the corrected location fix coordinates, produced by the entries in the pseudorange matrix $PR(t_c)_{cor}$, and the uncorrected location fix coordinates (x'(t'), y'(t'), z'(t'), b'(t)), produced by the entries in the uncorrected pseudorange matrix PR(t'). Here, the corrected time is $t=t_c=t'+b_c(t')$, where t' is the measured local time, $b_c(t')$ is the corrected time offset for the LD signal receiver/processor, and the uncorrected observation time is $t=t_{unc}=t'+b'(t')$.

Let T=T(t') represent a (usually nonlinear) transformation that is applied the individual entries PR(t';jm) (m=1,..., M) of the M×1 uncorrected pseudorange matrix or vector PR(t') and known LD signal source coordinate values to produce exact (possibly uncorrected) location fix coordinates (x'(t'), y'(t'), z'(t'), b'(t')) that reproduce the pseudorange values when inserted in the appropriate pseudorange equations (presented in one form in an Appendix to this specification). If M' of these location fix coordinates are already known, with M'=0, 1 or 2, preferably M=4-M'. The transformation T(t'), applied to the entries of the M×1 corrected pseudorange matrix or vector $PR(t')_{cor}$, produces exact, corrected location fix coordinates $((x_c(t), y_c(t), z_c(t), b_c(t))$. If all four location fix coordinates x, y, z and b are to be determined, and if M=4, the transformation T(t') is invertible so that $T(t')^{-1}$ exists and is computable. If only J location fix coordinates are required (J<4), if the remaining 4−J location fix coordinates are known from other information, and if M=J, the transformation T is also invertible. If M>4, the transformation T(t') may be invertible, if additional information is provided. One such transformation T(t'), which provides an exact solution for the location fix coordinates for a given set of pseudorange values, is presented in the Appendix.

In a first embodiment, a selected location receives LD signals from M LD signal sources and measures the uncorrected pseudorange values PR(t';jm;loc) (m=1,..., M; M≧4). An LD signal receiver/processor located at or near the selected location applies the transformation T(t') to these pseudorange values to produce uncorrected location fix coordinates (x'(t';loc), y'(t';loc), z'(t';loc), b'(t';loc))=T(t'){PR(t';j1;loc), ..., PR(t';jM;loc)} for the selected location at the exact, uncorrected time $t_{unc}=t'+b'(t)$. A transmitter connected to the LD signal receiver/processor transmits to a reference station a location fix signal $L_{loc}(t')=\{x'(t';loc), y'(t';loc), z'(t';loc), b'(t';loc), t', j1, ..., jM\}$ (an ordered sequence of numerical values that includes the uncorrected location fix coordinates (or J such coordinates, if only J are needed), the uncorrected local time t' and the numbers j1, ..., jM of the LD signal sources in the LD signal source constellation C(j1,..., jM) used to produce the pseudorange measurements from which the location fix coordinates are computed.

The reference station receives the signal $L_{loc}(t')$ and, based upon the agreed ordering of the variables in this signal, extracts the exact, uncorrected location fix coordinate values x'(t';loc), y'(t';loc), z'(t';loc), b'(t';loc), and the other variables t', j1, ..., jM. The reference station redetermines the uncorrected pseudorange values PR(t';jm;loc) (m=1..., M)=$T^{-1}$(t'){x'(t';loc), y'(t';loc), z'(t';loc), b'(t';loc)} for the user station for the uncorrected observation time t=t'+b'(t';loc).

Because the transformation T(t') is exact and invertible, the extracted uncorrected pseudorange values PR(t';jm;loc) computed at the reference station are the same as the corresponding pseudorange values measured at the selected location. This equality of pseudorange values may not hold where a transformation T' is used (in place of the transformation T) that is not exact and/or is not invertible.

The reference station applies the corrected pseudorange values PR(t';jm;ref)$_{cor}$ (computed for the known location of the reference station), determines pseudorange corrections PRC(t';jm)=PR(t';jm;ref)$_{cor}$+PR(t';jm;ref) for itself, and computes corrected pseudorange values PR(t';jm;loc)$_{cor}$=PR(t';jm;loc)+PRC(t';jm;ref) for the selected location at the time t'. The reference station applies the transformation T(t') to the corrected pseudorange values PR(t';jm;loc)$_{cor}$ to determine corrected exact location fix coordinates $(x_c(t;loc), y_c(t;loc), z_c(t;loc), b_c(t;loc))$ for the user station at a corrected observation time $t=t_c=t'+b_c(t')$.

Each of the selected location (user station) and the reference station has available to it the parameters needed to compute the absolute spatial location coordinates $(x_{jm}(t'), y_{jm}(t'), z_{jm}(t'))$ (m=1, ..., M) for each of the M LD signal sources in the constellation C(j1, ...,jM) in a selected coordinate system, such as an Earth-centered, Earth-fixed (ECEF) coordinate system. In a second embodiment, discussed below, the selected location also has available to it the corrected location fix coordinates $(x_c(t;ref), y_c(t;ref), z_c(t;ref), b_c(t;ref))$ or the corrected pseudorange values PR(t';jm;ref)$_{cor}$ for the reference station.

The invention determines and uses (1) location fix coordinates for a selected location and (2) pseudorange measurements made at the selected location that exactly reproduce each other. The clock offset coordinate b'(t') can be static or can vary with time. If J location fix coordinates (J=2, 3, 4) are to be determined, pseudorange measurements from J LD signal sources are required. If the clock offset parameter b(t') is required and is assumed to vary nontrivially with time according to a power law or some other reasonably well behaved analytic model, pseudorange measurements from J+1 or more LD signal sources are required to determine J location fix coordinates for the user. In the static (dynamic) clock offset situation, if pseudorange measurements from at least J+1(J+2) sources are available, the location fix coordinates may be determined by minimizing a weighted error sum or by certain geometric constructions that are presented in the Appendix. LD signal sources may be synchronous satellites, non-geosynchronous satellites, fixed or mobile ground-based sources or a mixture of any of these.

In a second embodiment, the roles of the reference station and the user station are partly reversed. The reference station receives LD signals, measures its own uncorrected pseudorange values PR(t';jm;ref) (m=1. . ., M), and computes uncorrected but exact location fix coordinates (x'(t';ref), y'(t';ref), z'(t';ref), b'(t';ref)) from the pseudorange values PR(t';jm;ref), using the exact transformation T(t'). Optionally, only the uncorrected clock offset parameter b'(t';ref) need be determined here. The reference station determines the corrected time offset value $b_c(t')$ for itself for the observation time $t=t_c=t'+b_c(t';ref)$, where $b_c(t';ref)$ is assumed to be known at the reference station through use of an atomic clock, use of a common clock, or by other means. The reference station then transmits a reference station location fix difference signal $L_{ref,1}(t')=\{x'(t';ref)-x_c((t;ref), y'(t';ref)-y_c((t'];ref), z'(t';ref)-z_c((t;ref), b'(t';ref)-b_c((t;ref), t', j1, \ldots, jM\}$(an ordered sequence of numerical values). The recipient user station is assumed to have available to it the corrected location fix coordinates $(x_c(t;ref), y_c(t;ref), z_c(t;ref), b_c(t;ref))$ for the reference station. Alternatively, a reference station location fix signal $L_{ref,2}(t')=\{x'(t';ref), y'(t';ref), z'(t';ref), b'(t';ref), t', j1, \ldots, jM\}$ can be transmitted instead of the difference signal $L_{ref,1}(t')$.

A user station receives the signal $L_{ref,i}(t')$ (i=1, 2), extracts the individual values contained therein, computes the uncorrected pseudorange values PR(t';jm;ref)=$T^{-1}(t')\{x'(t';ref), y'(t';ref), z'(t';ref), b'(t';ref); j1, \ldots, jM\}$ for the reference station, and computes pseudorange correction values PRC (t;jm;ref)=$PR(t_c;jm;ref)_{cor}-PR(t';jm;ref)$ (m=1, . . . , M), using the available corrected location fix coordinates for the reference station. The user station then computes corrected pseudorange values $PR(t';jm;loc)_{cor}=PR(t';jm;loc)+PRC$ (t;jm;ref). The user station applies the transformation T(t') to the corrected pseudorange values $PR(t_c;jm;loc)_{cor}$ to determine the corrected location fix coordinates $(x_c(t_c;loc), y_c(t_c;loc), z_c(t_c;loc), b_c(t_c;loc))$ =$T(t')\{PR(t_c;j1;loc)_{cor}, \ldots, PR(t_c;jM;loc)_{cor}, t', j1, \ldots, jM\}$ for the selected location at the corrected observation time $t=t_c=t'+b_c(t')$.

In the usual approach in the prior art, the reference station receives LD signals, measures the uncorrected pseudorange associated with each of these signals, determines the pseudorange corrections based on the corrected pseudorange values stored at the reference station, and broadcasts the pseudorange corrections, which may have large dynamic ranges. A nearby user station receives the pseudorange corrections, applies these corrections to the pseudorange values measured at the user station, and applies an iterative or other approximate method to obtain approximate corrected user station location fix coordinates that correspond approximately to the corrected user station pseudorange values. The usual approach relies upon (1) computation and broadcast of pseudorange correction values computed for the reference station, (2) use of the received pseudorange correction values to compute corrected pseudorange values at a user station and (3) relies upon an iterative or other approximate method to convert the corrected pseudorange values to corrected user station location fix coordinates.

The approach disclosed here does not rely on these three steps and, in addition, provides several major benefits. First, this approach requires only one-way transmission of as few as four location fix coordinate values, the local time t', and M LD signal source numbers that define the LD signal source constellation used. If the LD signal source constellation numbers are unchanging over a time interval, specification of these LD signal source numbers may be deleted after the first transmission of these numbers in this time interval, and the number of bytes transmitted in the location fix signal $L_{loc}(t')$ is thereby reduced. Time variations of the spatial location coordinate values are often limited to dynamic ranges of a few hundred kilometers or less, and these values change relatively slowly with time, whereas the variations with time of the pseudorange values have dynamic ranges that are orders of magnitude larger. Thus, relatively few bits (as few as 16 per coordinate) are required for such transmission of the location fix coordinate information. Second, the location fix coordinate information may be transmitted by the user station or by the reference station so that the corrected location fix coordinates for the user station can be computed at whichever station requires them, not merely at the user station. Third, this approach uses an exact, invertible correspondence, not relying on an iterative or other approximate solution, between location fix coordinates and pseudorange measurements, to determine and apply pseudorange corrections for a user station. Fourth, this exact location fix-pseudorange correspondence primarily uses information for the station (reference or user) of interest.

DESCRIPTION OF BEST MODES OF THE INVENTION

Figure 1:
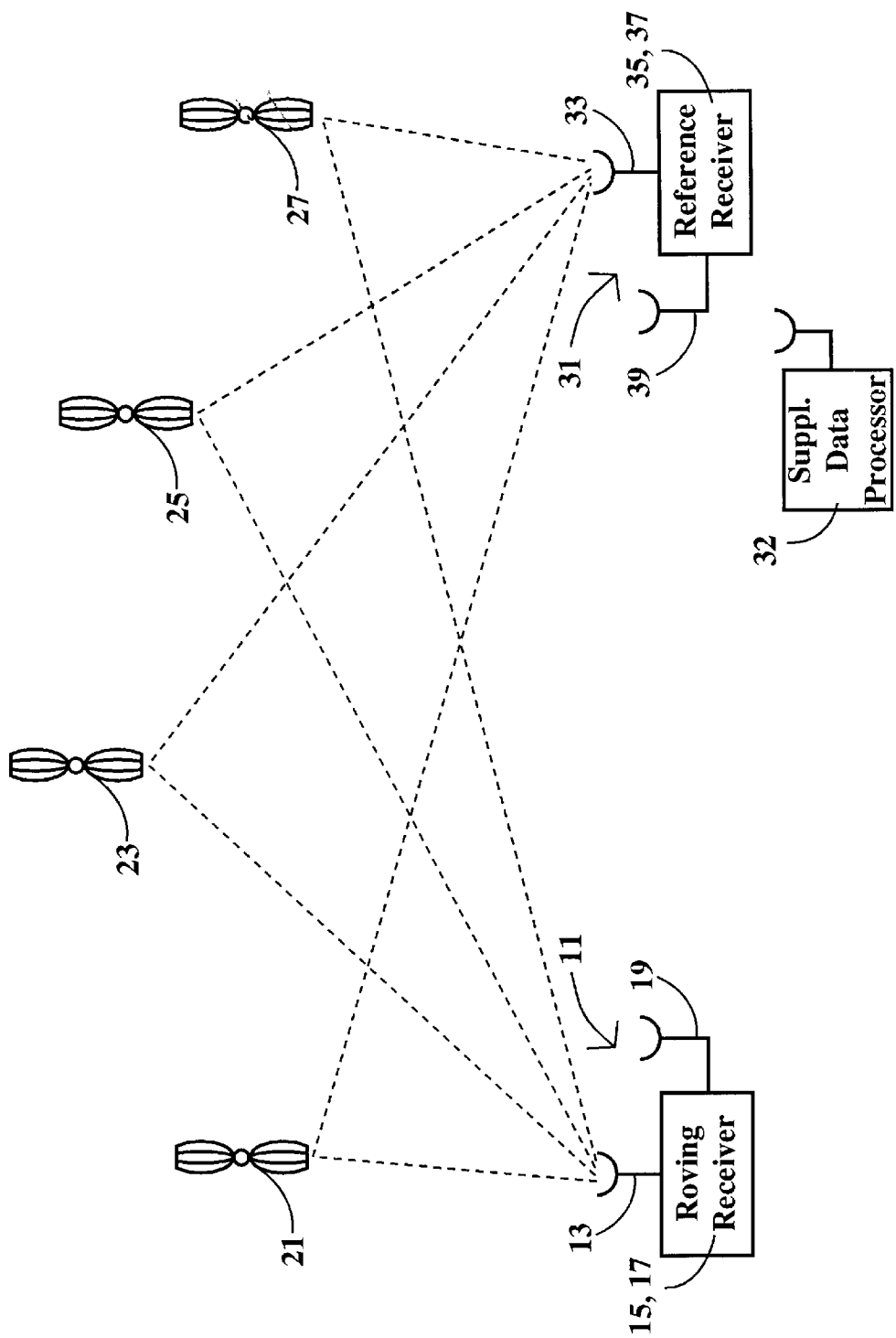
FIGS. 1 and 2 illustrate use of the invention with a satellite-based LD system and with a ground-based LD system.

A user station 11 carries an LD signal antenna 13 and associated LD signal receiver/processor 15 and a user station transmitter or receiver 17 and associated antenna 19 that are connected to the LD receiver/processor 15, in one embodiment of the invention shown in FIG. 1. The user station 11 receives LD signals from M ($\geq 4$) satellite-based LD signal sources 21, 22, 23 and 24. Each received LD signal has a corresponding measurable pseudorange value PR(t';jm;loc) (m=1, 2, . . . , M), which is a range computed using elapsed time between a time of transmission of an LD signal by an LD signal source and a time of receipt of the LD signal by an LD antenna 13 at a selected location ("loc"), usually without correction for any effects such ionospheric time delay, tropospheric time delay, multipath signal time distortion, receiver error and other similar environmental perturbations. Optionally, the effect(s) of one or more of the ionospheric time delay, the tropospheric time delay, multipath signal time distortion, receiver error and other similar environmental perturbations can be modeled and partly or fully eliminated from the measured pseudorange values.

The Appendix presents an innovative approach for determining exact values of the set of, or any subset of, spatial location coordinates x', y' and z' and clock offset parameter b' associated with the LD antenna 11, if LD signals are received from J (or J+1) LD signal sources and J of the location fix coordinates x', y', z' and/or b' are to be determined, with J=2, 3, or 4. The spatial location coordinates (x',y',z') may be expressed in any coordinate system and are not limited to a Cartesian system.

A reference station 31, with a known location (which, optionally, may move as time changes) also has an LD signal antenna 33 and an LD signal receiver/processor 35 that receive and process LD signals from the M LD signal sources 21, 22, 23 and 24. The reference station 31 has stored thereat or otherwise available to it corrected pseudorange values $PR(t';jm;ref)_{cor}$ that the reference station should receive, based on its known location and known location coordinates $(x_{jm}(t'),y_{jm}(t'),z_{jm}(t'))$ for the M LD signal sources. The reference station 31 determines pseudorange corrections $$PRC(t';jm;ref)=PR(t';jm;ref)-PR(t';jm;ref)_{cor}, \quad (1)$$

for its own known location and time of measurement, using the LD signals received from these M LD signal sources. The reference station 31 also includes a receiver or transmitter 37 and associated antenna 38 that can receive location fix signals $L_{loc}(t')$ transmitted by, or transmit location fix signals $L_{ref}(t')$ to, a user station transmitter 17 and associated antenna 19.

Figure 2:
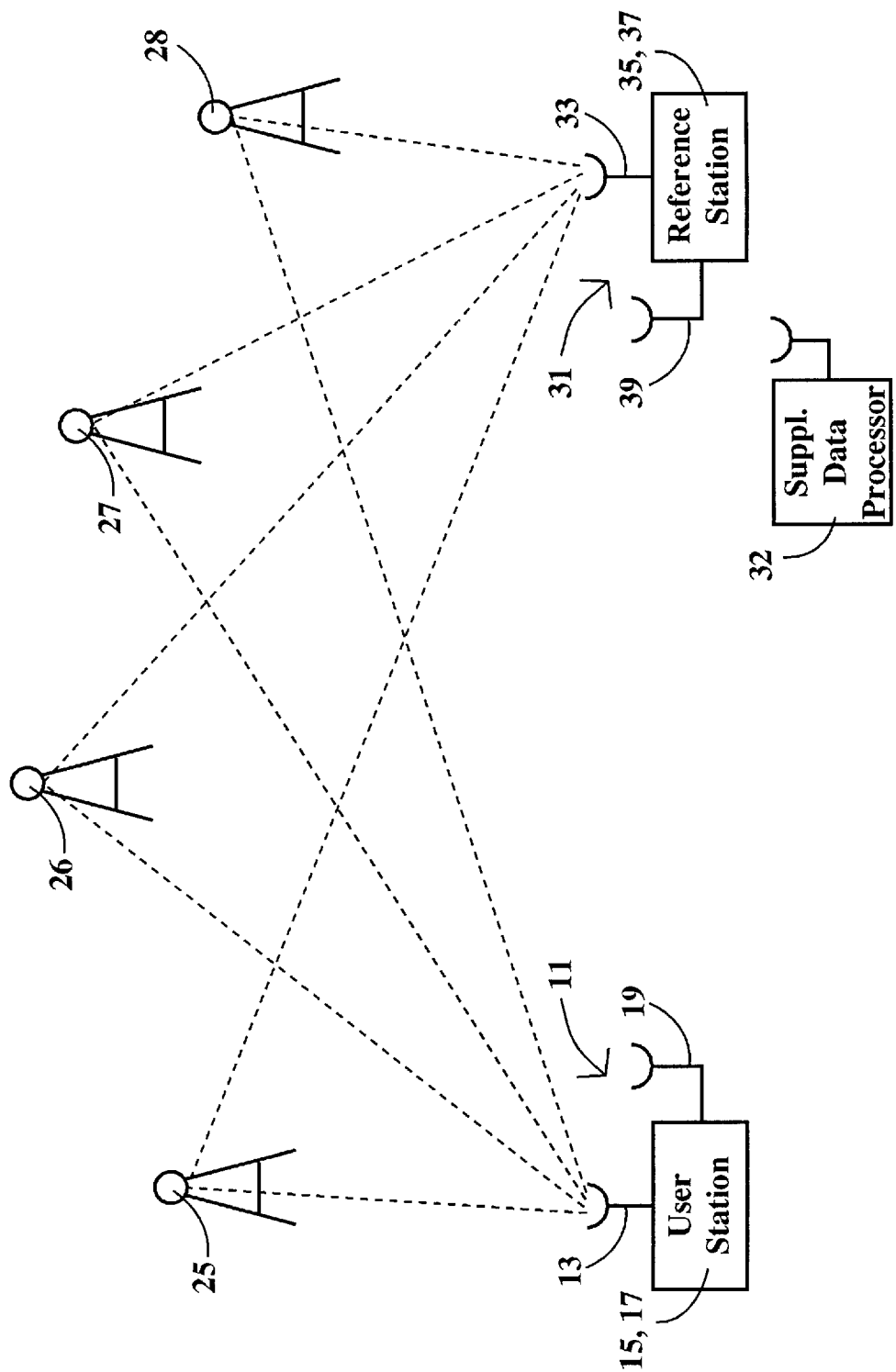

FIG. 2 illustrates another environment in which the invention can be used, wherein satellite-based LD signal sources 21, 22, 23 and 24 are replaced by ground-based LD signal sources 25, 26, 27 and 28. In most other respects, the system shown in FIG. 2 operates in a manner similar to the system shown in FIG. 1.

Figure 3:
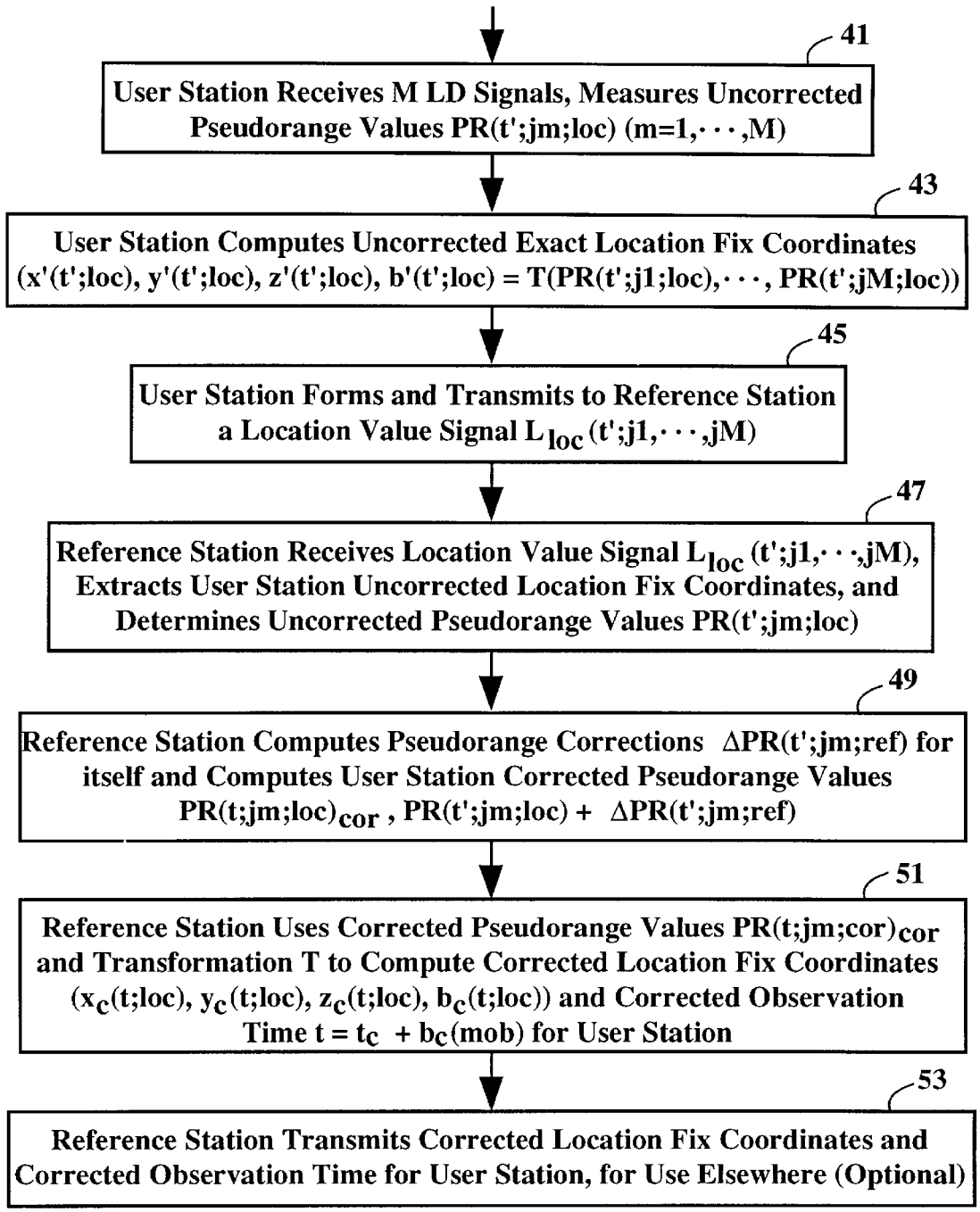
FIGS. 3, 4 and 5 are flow diagrams illustrating use of the invention in three embodiments.

FIG. 3 illustrates, in flow chart form, operation of a first embodiment of the invention. In step 41, the user station 11 (or its antenna 13) receives LD signals from M LD signal sources and measures the corresponding uncorrected pseudorange values $PR(t';jm;loc)(m=1, 2,\ldots, M)$ at a local time t'. The pseudorange values $PR(t';jm;loc)$ are related to the present location fix coordinates (x',y',z',b') for the user station by the relations $$PR(t=t_{r,m};m;loc)=c(t_{r,m}+\Delta t_{r,m})-c(t_{s,m}+\Delta t_{s,m})+I_{r,s,m}+T_{r,s,m}+R_{r,s,m}, \quad (2)$$

$$b=c\Delta t_{r,m}, \quad (3)$$

where an LD signal is transmitted by an LD signal source number jm at an uncorrected time $t=t_{s,m}$ and is received by the user station at an uncorrected time $t=t_{r,m}$ and where $\Delta t_{s,m}$ and $\Delta t_{r,m}$ are appropriate corrections for the LD signal source clock and user station clock, respectively. Here, $I_{r,s,m}$ and $T_{r,s,m}$ are time delays, if any, associated with propagation of the LD signal through the ionosphere and through the troposphere, respectively, and $R_{r,s,m}$ represents time delays associated with other signal perturbations, such as multipath signals and/or receiver error. Here, the true range from LD signal source number jm to the user station 11 is $$c(t_{r,m}-t_{s,m}-\Delta t_{s,m})=\{(x'-x_{jm})^2+(y'-y_{jm})^2+(z'z_{jm})^2\}^{1/2}. \quad (4)$$

The quantities $t_{r,m}$, $t_{s,m}$ and $\Delta t_{s,m}$ are assumed to be known or approximatable at the user station. It is assumed that the following sources of possible error have been modeled and/or largely removed from the pseudorange measurement: user station receiver error (e.g., receiver noise and/or signal processing delay); LD signal source transmitter error (e.g., transmitter noise and/or signal processing delay); LD signal source clock offset ($\Delta t_{s,m}$); time delay, relative to signal propagation in a uniform ambient medium, of arrival of a signal due to signal propagation in the ionosphere ($I_{s,r,m}$) and in the troposphere ($T_{s,r,m}$)); and multipath signal error.

Equations (2) for a constellation $C(j1,j2,\ldots,jM)$ of M LD signal sources are solved exactly at the user station, using an innovative method set forth in the Appendix. The invention uses a (normally nonlinear) transformation $T(t')$ that is applied to the set of pseudorange measurements $\{PR(t';j1;loc), PR(t';j2;loc), \ldots, PR(t';jM;loc)\}$(preferably with M=4)to produce exact solutions for the location fix coordinates x'(t';loc), y'(t';loc), z'(t';loc), and/or b'(t';loc), according to the relationship $$T(t')\{PR(t';j1;loc), PR(t';j2;loc), \ldots, PR(t';jM;loc)\}=\{x'(t';loc), y'(t';loc), z'(t';loc), b'(t';loc)\}. \quad (5)$$

In step 43, the user station 11 applies the transformation $T=T(t')$ and determines the uncorrected location fix coordinates x'(t';loc), y'(t';loc), z'(t';loc) and/or b'(t';loc).

In step 45, the user station 11 forms and transmits to the reference station 31 a location fix signal defined by $$L_{loc}(t')=\{x'(t';loc),y'(t';loc),z'(t';loc),b'(t';loc),t',j1,j2,\ldots,jM\} \quad (6)$$

containing an ordered set of four or fewer uncorrected location fix coordinates, the uncorrected signal observation time t' and indicia representing the numbers of the M satellites in the LD signal source constellation $C(j1,\ldots,jM)$ used by the user station to determine its location fix coordinates.

In step 47, the location fix signal $L_{loc}(t')$ is received by the reference station 31, located within a few hundred kilometers from, but usually spaced apart from, the user station 11. The reference station 31 extracts the uncorrected location fix coordinates and uncorrected observation time t' for the user station 11 and (re)determines the user station uncorrected pseudorange values $PR(t';jm;loc)$, using Eqs. (2), (3) and (4) or some other suitable relations. The spatial location coordinates of the reference station 31 are known with high accuracy, possibly through a survey or by other means for a stationary reference station.

In step 49, the reference station 31 determines corrected pseudorange values $PR(t,jm;ref)_{cor}$, which should have been measured for the reference station at the uncorrected observation time t=t', and computes pseudorange corrections according to Eq. (1) for the uncorrected observation time t' for m=1, 2, . . . , M. The reference station 31 computes the uncorrected pseudorange values $$\{PR(t';j1;loc), PR(t';j2;loc), \ldots, PR(t';jM;loc)\}=T^{-1}(t')\{x'(t';loc), y'(t';loc), z'(t';loc), b'(t';loc)\} \quad (7)$$

and computes corrected pseudorange values $$PR(t';jm;loc)_{cor}=PR(t';jm;loc)+PRC(t';jm;ref) \quad (8)$$

for the user station 11.

In step 51, the reference station 31 applies the transformation $T(t')$ to this set of corrected pseudorange values to produce corrected exact location fix coordinates for the user station 11, viz.

$$T(t')\{PR(t';j1;loc)_{cor}, PR(t';j2;loc)_{cor}, \ldots PR(t';jM;loc)_{cor}\}=(x_c(t;loc), y_c(t;loc), z_c(t;loc), b_c(t;loc)\}, \quad (9)$$

where one or more of these corrected location fix coordinates may be known beforehand from other information. These corrected location fix coordinates can be stored or used by the reference station 31 or can be transmitted to the user station 11 or elsewhere for subsequent use, in step 53 (optional).

Alternatively, the uncorrected location fix coordinates can be received and processed by a supplemental data processor 32 (FIGS. 1 and 2) that is associated with, but is not part of, the reference station 32. It is assumed here that the supplemental data processor 32 has available to it the known location coordinates and/or the corrected pseudorange values for the reference station 31.

If the number of LD signal sources in the constellation $C(j1, \ldots, jM)$ is M=4, the transformation $T(t')$ provides exact solutions for the location fix coordinates. If the number M of LD signal sources in the constellation $C(j1, \ldots, jM)$ used here is greater than 4 (M≥5), the transformation $T(t')$ can be used to determine solutions of Eq. (2), (3) and (4), if as many as M-4 additional constraints are imposed. Alternatively, one of the approaches discussed in the Appendix can be used to determine "best fit" for the location fix coordinates.

Figure 4:
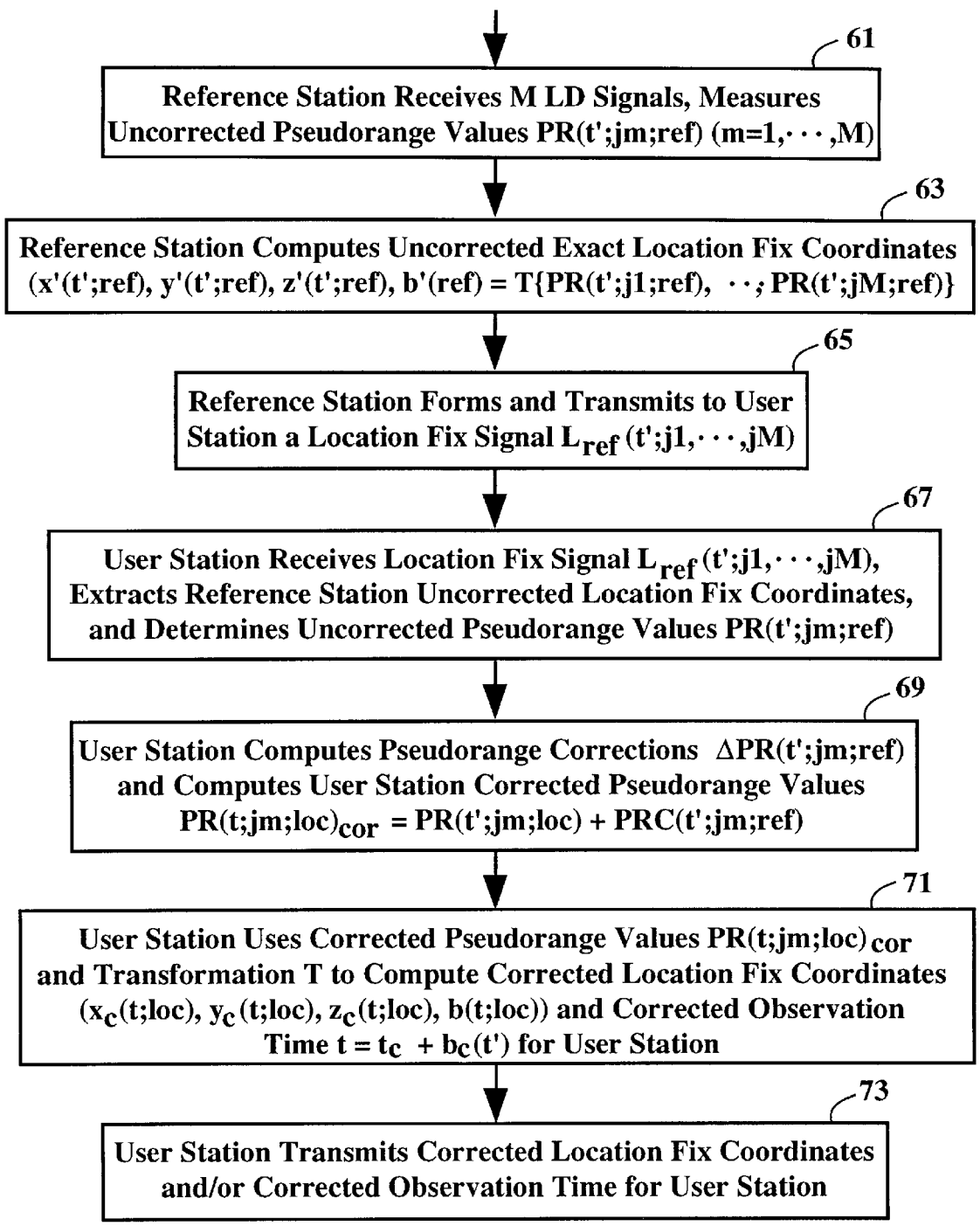

FIG. 4 illustrates, in flow chart form, a second embodiment of the invention. In step 61, the reference station 31 receives LD signals from each of M LD signal sources and measures the uncorrected pseudorange values PR(t';jm;ref) (m=1, ..., M). The reference station 31 and the user station 11 have stored thereat, or otherwise available, the accurately known location coordinates for the reference station and the spatial location coordinates $(x_{jm}(t), y_{jm}(t), z_{jm}(t))$ for each of the M LD signal sources, including ephemeris corrections that are broadcast from time to time.

In step 63, the reference station 31 computes its own uncorrected exact location fix coordinates (x'(t';ref), y'(t';ref), z'(t';ref), b'(t';ref)) and the uncorrected observation time $t_{unc}$=t'+b'(t';ref), using the exact transformation T(t') applied as follows.

$$T(t')\{PR(t';j1;ref), PR(t';j2;ref), \ldots, PR(t';jM;ref)\}=(x'(t';ref), y'(t';ref), z'(t';ref), b'(t';ref)). \quad (10)$$

In step 65, the reference station 31 forms a first reference station location fix difference signal $$L_{ref,1}(t')=\{x'(t';ref)-x_c(t'), y'(t';ref)-y_c, z'(t';ref)-z_c, b'(t';ref)-b_c(t';ref), t', j1, j2, \ldots, jM\} \quad (11)$$

and transmits this signal to the user station 11. This assumes that the user station 11 has available to it the LD signal source spatial location coordinates $(x_{jm}(t'), y_{jm}(t'), z_{jm}(t'))$, the correct reference station location fix coordinates $x_c(t';ref)$, $y_c(t';ref)$, $z_c(t';ref)$ and $b_c(t;ref)$ and/or the correct pseudorange values PR(t';jm;ref).

In step 67, the user station 11 receives the reference station location fix difference signal $L_{ref}(t')$ and extracts the uncorrected location fix coordinate differences x'(t';ref)–$x_c$(t';ref), y'(t';ref)–$y_c$(t';ref), z'(t';ref)–$z_c$(t';ref) and/or b'(t';ref)–$b_c$(t';ref), the uncorrected observation time t' and the LD signal source constellation C(j1, ..., jM) indicia, computes the uncorrected exact location fix coordinates x'(t';ref), y'(t';ref), z'(t';ref) and/or b'(t';ref), and computes the uncorrected pseudorange values PR(t',jm;ref) (m =1, ..., M) for the reference station 31, using the inverse exact transformation $T^{-1}(t')$.

In step 69, the user station 11, using its knowledge of the locations of the reference station and of the M LD signal sources, which may be fixed or may be changing with time, computes the pseudorange corrections PRC(t';jm;ref) for the reference station 31 and computes the corrected pseudorange values PR(t';jm;loc)$_{cor}$ for the user station or selected location, using Eqs. (1).

In step 71, the user station 11 uses the corrected pseudorange values PR(t';jm;loc)$_{cor}$ and the exact transformation T(t') in Eq. (9) to compute corrected location fix coordinates $x_c$(t;loc), $y_c$(t;loc), $z_c$(t;loc) and/or $b_c$(t';loc) and the corrected observation time t=$t_{cor}$=t'+b(t';loc) for the user station 11. Optionally, in step 73 the user station 11 transmits part or all of this information for use elsewhere.

Figure 5:
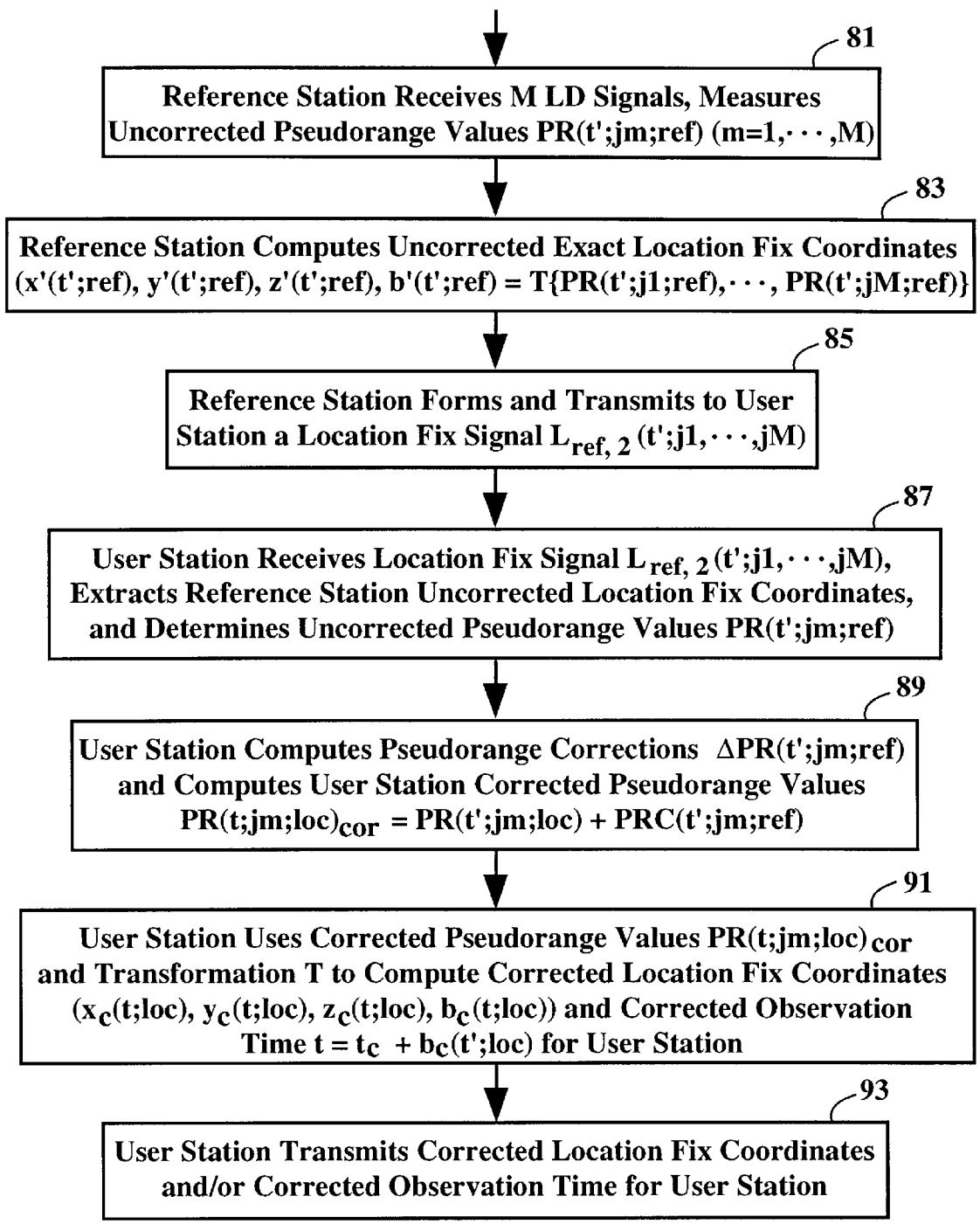

In a third embodiment, illustrated in flow chart form in FIG. 5, the steps 81 and 83 are identical to the steps 61 and 63, respectively. In step 85, the reference station 31 forms a second reference station location fix signal $$L_{ref,2}(t')=\{x'(t';ref),y'(t';ref),z'(t';ref),b'(t';ref), t', j1, j2, \ldots, jM\} \quad (12)$$

and transmits this signal to the user station 11.

In step 87, the user station 11 receives the reference station location fix difference signal $L_{ref,2}$(t') and extracts the uncorrected location fix coordinates x'(t';ref), y'(t';ref), z'(t';ref) and/or b'(t';ref), the uncorrected observation time t' and the LD signal source constellation C(j1, ..., jM) and computes the uncorrected pseudorange values PR(t';jm;ref) (m=1, ..., M) for the reference station 31, using the inverse exact transformation $T^{-1}$(t').

Steps 89, 91 and 93 are identical to the respective steps 69, 71 and 73 in FIG. 4.

In the first embodiment: (1) uncorrected pseudorange values are measured at the user station; (2) uncorrected exact location fix coordinate values x'(t';loc), y'(t';loc), z'(t';loc) and/or b'(t';loc) for the observation time t=t'+b'(t') are computed at the user station, using an exact transformation T(t'); (3) a user station location fix signal $L_{loc}$(t'), including information on the user station uncorrected location fix coordinates, the observation time and indicia indicating the LD signal source constellation used, are transmitted by the user station and are received by the reference station; (4) uncorrected pseudorange values for the user station are computed at the reference station, using the inverse exact transformation $T^{-1}$(t'); (5) pseudorange corrections for the reference station are determined and are used to compute corrected pseudorange values for the user station; and (6) corrected location fix coordinates for the user station are computed, using corrected pseudorange values for the user station and using the exact transformation T(t').

In the second and third embodiments: (1') uncorrected pseudorange values are measured at the user station; (2') uncorrected location fix coordinate values x'(t';ref), y'(t';ref), z'(t';ref) and/or b'(t';ref) for the observation time t=t'+b' (t';ref) are computed at the reference station, using an exact transformation T(t'); (3') a reference station location fix signal $L_{ref}$(t'), including information on the reference station uncorrected location fix coordinates, the observation time and indicia indicating the LD signal source constellation used, are transmitted by the reference station and are received by the user station; (4') uncorrected pseudorange values for the reference station are computed at the user station, using the inverse exact transformation $T^{-1}$(t'); (5') pseudorange corrections for the reference station are determined at the user station and are used to compute corrected pseudorange values for the user station; and (6') corrected exact location fix coordinates for the user station are computed, using corrected pseudorange values for the user station and using the exact transformation T(t').

Steps (1), (2), (3), (4), (5) and (6) for the first embodiment correspond approximately to steps (1'), (2"), (3'), (4'), (5') and (6') for the second and third embodiments, respectively. The values transmitted in the location fix signal $L_{loc}$(t') or $L_{ref,i}$(t') (i=1, 2) are chosen for efficiency, not necessarily for ease of computation. Through use of the exact transformation T(t') and its inverse, the user is assured that the (exact) computation of location fix coordinates from the pseudorange values will produce the same results, whether carried out at the user station 11, at the reference station 31, or at the supplemental data processor 32.

The spatial location coordinates of the user station 11 and of the reference station 31 have modest dynamic ranges, such as a few hundred meters or less, because the spatial location changes relatively slowly, if at all. The clock bias or clock offset coordinate b and the local time t' also have limited dynamic ranges for a reasonable time interval. Each of these five coordinate values can be stored in a memory as a double precision numerical value (about 16 bits each). The identifying number for each LD signal source in the constellation C(j1, ..., jM) requires five bits, if at most 32(=$2^5$) LD signal sources are present. The total number of bits required for the location fix signal $L_{loc}$ or $L_{ref}$, exclusive of any bits used for a header or a footer for this signal, is thus 80+5M bits, or 100 bits if M=4.

By comparison, if pseudorange values, rather than location fix coordinates, are to be transmitted between the user station and the reference station or supplemental data processor station, the possible dynamic ranges would be much larger. Specification of the time coordinate requires sub-millisecond accuracy (16 bits or more); and full range transmission of the pseudorange values would probably require 2M double precision coordinate values for M LD signal sources. The total number of bits transmitted for M LD signal sources is estimated at 37M+16 bits, or 164 bits for M=4. Thus, the savings in number of bits transmitted is substantial.

Figure 6:
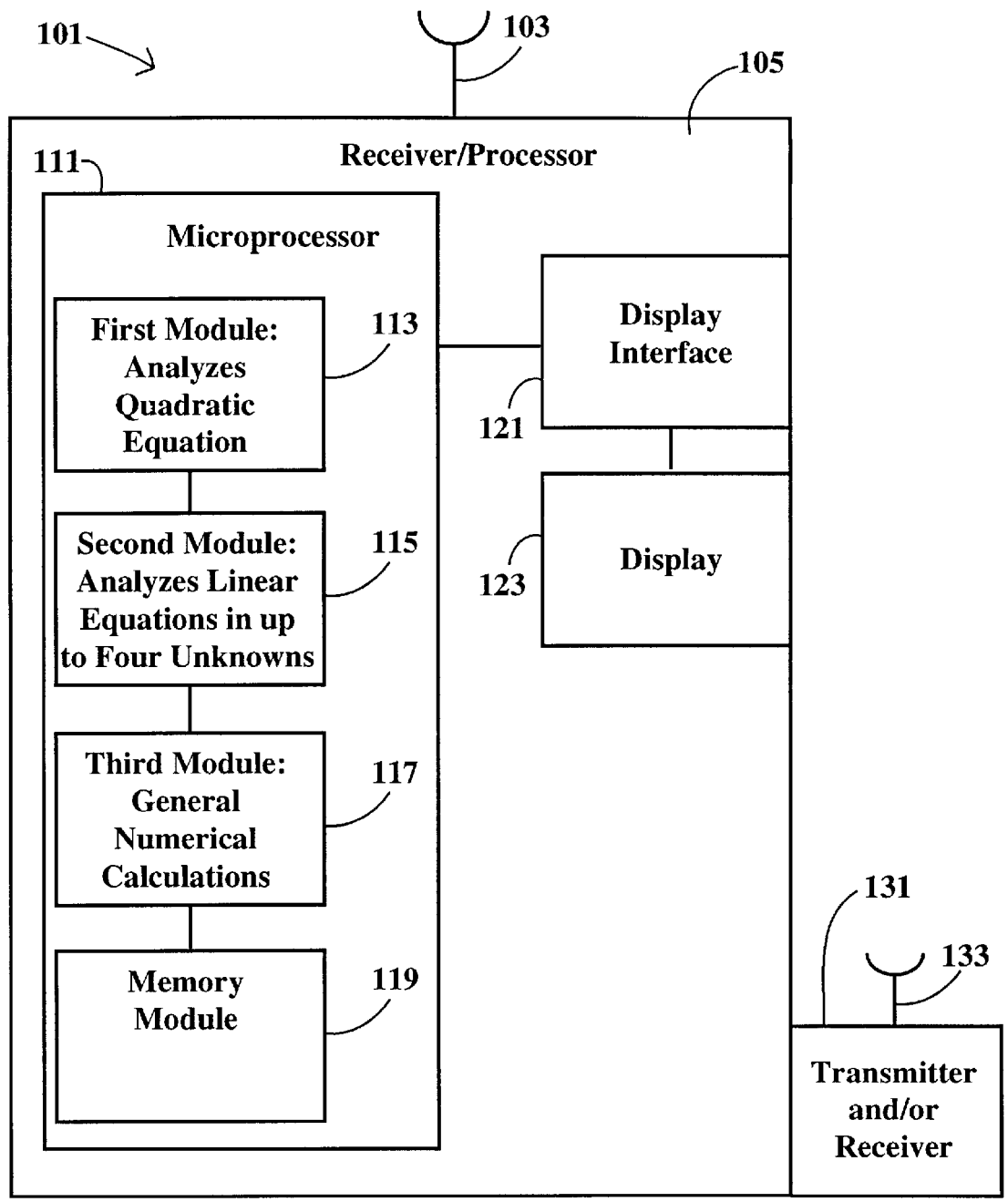
FIG. 6 is a schematic view of apparatus suitable for practicing the invention at a user station and at a reference station.

FIG. 6 illustrates an embodiment of LD station apparatus 101 that is suitable for practicing the invention. The LD station apparatus 101 includes an LD signal antenna 103 connected to an LD signal receiver/processor 105.

The LD receiver/processor 105 includes a microprocessor 111 having: a first programmed module 113 that receives, analyzes and determines the solution of a quadratic equation in one unknown; a second programmed module 115 that receives, analyzes and determines the solution of up to four linear equations in four unknowns; a third programmed module 117 for general numerical calculations; a memory module 119 for storing the location coordinates ($x_n,y_n,z_n$) (n=1, ..., M; M≧2) for each of M LD signal sources (e.g., SATPS satellites or ground-based LD signal towers) at a selected sequence of times for each LD signal source, and for receiving and temporarily storing numerical values therein. The LD receiver/processor 105 also includes an optional display interface 121 and display 123, connected to the microprocessor 111, for presenting a visually perceptible (numerical or graphical) display or audibly perceptible display of the location coordinates (x,y,z) and/or the clock offset parameters b and/or a, determined using the invention disclosed in the preceding discussion. Optionally, the LD station apparatus 101 also includes a transmitter and/or receiver 131 and associated antenna 133, connected to the LD receiver/processor 105, for transmitting signals to and/or receiving signals from another receiver and/or transmitter that is spaced apart from the LD station 101; these transmitted/received signals would normally include location fix coordinates or location fix coordinate differences. The apparatus 101 can be used at a user station or at a reference station, with suitable programming of the first, second and third programmed modules 111, 113 and 115. The apparatus 101 will normally process the received information and determine corrected location coordinates for the user station or other selected location in real time. Alternatively, the received information, unprocessed or partly processed, may be stored in the memory 119 and be post-processed at a more convenient time, location and/or computer facility.

The preceding disclosure has focused on use of LD signals, received from satellite-based signal sources, such as GPS, GLONASS, LEOS and Geostar, for pseudorange measurements and location determination. The invention can be implemented using satellite-based LD signals sources, such as GPS, GLONASS, LEOS and Geostar satellites, or using ground-based LD signal sources, such as Loran C/D, Tacan, Decca, Omega, VOR/DME, JTIDS Relnav and PLRS. Several of these ground-based location determination systems are summarized by Tom Logsdon in *The Navstar Global Positioning System*, Van Nostrand Reinhold, 1992, pp. 1–16 and 34–47.

Use of GPS and GLONASS signals for location determination is discussed by Logsdon, op cit, pp. 17–33, 48–90 and 115–119. An LD signal antenna receives LD signals from two or more LD signal sources (satellites) and passes these signals to an LD signal receiver/processor, which (1) identifies the LD signal source for each LD signal received, (2) determines the time at which each identified LD signal arrives at the LD antenna, and (3) determines the present location of the LD antenna from this information and from information on the ephemerides for each identified LD signal source. The LD signal antenna and LD signal receiver/processor are part of the user segment of a particular LD system, such as the Global Positioning System.

A configuration of two or more spaced apart receivers of LD signals can be used to accurately determine the relative positions between the receivers or stations. This method, known as differential positioning, is far more accurate than absolute positioning, provided that the distances between these stations are substantially less than the distances from these stations to the LD signal sources, which is the usual case. Differential positioning can be used for survey or construction work in the field and can provide location coordinates and distances that are accurate to within a few centimeters.

In differential position determination, many of the errors in the LD system that compromise the accuracy of absolute position determination are similar in magnitude for stations that are physically close. The effect of these errors on the accuracy of differential position determination is therefore substantially reduced by a process of partial error cancellation.

In FIG. 1, a mobile location determination (LD) station or LD receiver or other user 11 moves on or near the Earth's surface. The LD station 11 includes an LD signal antenna 13 that receives LD signals from each of a plurality of M LD signal sources (M≧2) 21, 22, 23, 24 (FIG. 1), whose location coordinates ($x_{jm}(t)$, $y_{jm}(t)$, $z_{jm}(t)$) (m=1, ..., M) vary in a known manner with time t. The LD signal sources may be carried in geosynchronous or non-geosynchronous satellites (FIG. 1), or may be ground-based sources (FIG. 2), which transmit distinguishable, time-coded or frequency-coded electromagnetic signals. Optionally, these signals are coded using TDMA, FDMA or CDMA formats. A satellite-based LD signal source may be part of a satellite positiining system, such as the Global Positioning System (GPS), the Global Orbiting Navigational Satellite System (GLONASS), a Low Earth Orbiting System (LEOS) or other similar system that can be used or adapted for location determination. A ground-based LD signal system may be part of a system such as Loran, Tacan, Decca, Omega, VOR/DME, JTIDS Relnav and PLRS, many of which are discussed by Tom Logsdon, op cit.

Each LD signal is received by the LD antenna 13 and passed to the LD receiver/processor 15 that (1) distinguishes the LD signals received from each LD signal source, (2) determines or measures a pseudorange, as defined in the following discussion, between the LD signal source and the LD antenna 13, and (3) determines the present location of the LD station 11 from analysis of these measurements. The approach used here for determination of the present location coordinates (x,y,z) for the user or mobile station 11, or for a nearby slected location, is non-iterative and allows determination of these coordinates in three, relatively straightforward steps (for M=4). The result is a matrix equation relating the spatial location coordinates and clock offset linearly plus a quadratic equation involving only one of the location fix coordinates.

Assume that LD signals are received and that pseudorange measurements are made from LD signals received from each of M LD signal sources at the user station 11. The user station location coordinates (x,y,z) are unknown, and a time coordinate value t is also unknown as yet because of possible presence of a time offset error at the LD receiver/processor 15. Adopting the notation of Alfred Leick, *GPS Satellite Surveying*, John Wiley & Sons, New York, Second Edition, 1995, pages 248–253, the pseudorange value PR(t;m) for an LD signal received from LD signal source number n at the LD receiver 11 at (approximate) time $t=t_{r,m}$ is given by $$PR(t=t_{r,m};m)=c(t_{r,m}+\Delta t_{r,m})-c(t_{s,m}+\Delta t_{s,m})+I_{r,s,m}+T_{r,s,m}+R_{r,s,m}, \quad (A1)$$

where $(X_m,Y_m,z_m)=(x_m(t_{s,m}),y_m(t_{s,m}),z_m(t_{s,m}))$ are the (approximately) known location coordinates for the mth LD signal source at the time $(t=t_{s,m})$ an LD signal is transmitted, $\Delta t_{s,m}$ is the mth LD source clock error (assumed to be known or determinable at the LD station 11), $\Delta t_{r,m}$ is the receiver clock error (assumed to be approximately constant initially), c is a representative velocity of light propagation in the ambient medium, $I_{r,s,m}$ is the LD signal propagation time delay in the ionosphere, $T_{r,s,m}$ is the LD signal propagation time delay in the troposphere, and $R_{r,s,m}$ accounts for any residual time difference (multipath, receiver noise, receiver line biases, etc.). The four primary unknowns in Eq. (A1) are x, y, z and the user station receiver "clock offset"

$$b=c\Delta t_{r,m}, \quad (A2)$$

where the true range is given by $$c(t_{r,m}-t_{s,m}-\Delta t_{s,m})=\{(x-x_m)^2+(y-y_m)^2+(z-z_m)^2\}^{1/2}, \quad (A3)$$

where $(x_{jm},y_{jm},z_{jm})$ is sometimes written as $(x_m,y_m,z_m)$ here. The nominal clock times $t=t_{r,m}$ of receipt of the LD signals from different LD signal sources need not be the same for each LD signal source but are assumed to be close for all sources m=1, ..., M, preferably within a few milliseconds. Equation (A1) can be rewritten for each of the LD signal sources as $$[(x-x_1)^2+(y-y_1)^2+(z-z_1)^2]^{1/2}=\chi(t_{r,1};t_{s,1};1)-b, \quad (A4\text{-}1)$$

$$[(x-x_m)^2+(y-y_m)^2+(z-z_m)^2]^{1/2}=\chi(t_{r,m};t_{s,m};m)-b, \quad (A4\text{-}m)$$

...

$$[(x-x_M)^2+(y-y_M)^2+(z-z_M)^2]^{1/2}=\chi(t_{r,M};t_{s,M};M)-b, \quad (A4\text{-}M)$$

...

$$\chi(t_{r,m};t_{s,m};m)=PR(t=t_{r,m};m)-(I_{r,s,m}+T_{r,s,m}+R_{r,s,m}), \quad (A5)$$

where $\chi(t_{r,m};t_{s,m};m))$ is assumed to be known or determinable. Equations (A4-1) and (A4-m) ($1 \leq m \leq M$) can be rewritten in the form $$[(x-x_{1,m}-\Delta x_{1,m})^2+(y-y_{1,m}-\Delta y_{1,m})^2+(z-z_{1,m}-\Delta z_{1,m})^2]^{1/2}=\chi(t_{r,1};t_{s,1};1)-b, (m=2,\ldots,M) \quad (A4\text{-}1')$$

$$[(x-x_{1,m}+\Delta x_{1,m})^2+(y-y_{1,m}+\Delta y_{1,m})^2+(z-z_{1,m}+\Delta z_{1,m})^2]^{1/2}=-b\chi(t_{r,m};t_{s,m};m), \quad (A4\text{-}m')$$

$$x_{1,m}=(x_1+x_m)/2, \quad (A6)$$

$$y_{1,m}=(y_1+y_m)/2, \quad (A7)$$

$$z_{1,m}=(z_1+z_m)/2, \quad (A8)$$

$$\Delta x_{1,m}=(x_1-x_m)/2, \quad (A9)$$

$$\Delta y_{1,m}=(y_1-y_m)/2, \quad (A10)$$

$$\Delta z_{1,m}=(z_1-z_m)/2, \quad (A11)$$

Subtracting the square of Eq. (A4-m') from the square of Eq. (A4-1') yields the linear relation $$\Delta x_{1,m}(x-x_{1,m})+\Delta y_{1,m}(y-y_{1,m})+\Delta z_{1,m}(z-z_{1,m})==A_{1,m}-B_{1,m}b, \quad (A12)$$

$$A_{1,m}=\chi(t_{r,1};t_{s,1};1)^2-\chi(t_{r,m};t_{s,m};m)^2, \quad (A13)$$

$$B_{1,m}=2[\chi(t_{r,1};t_{s,1};1)-\chi(t_{r,m};t_{s,m};m)]. \quad (A14)$$

More generally, one can subtract the square of Eq. (A4-k') from the square of Eq. (A4-m') to produce a linear relation in x, y, z and b, viz.

$$\Delta x_{m,k}(x-x_{m,k})+\Delta y_{m,k}(y-y_{m,k})+\Delta z_{m,k}(z-z_{m,k})==A_{m,k}-B_{m,k}b(m\neq k; m,k=1,\ldots,N), \quad (A15)$$

$$x_{m,k}=(x_m+x_k)/2, \quad (A16)$$

$$\Delta x_{m,k}=(x_m-x_k)/2, \quad (A17)$$

$$y_{m,k}=(y_m+y_k)/2, \quad (A18)$$

$$\Delta y_{m,k}=(y_m-y_k)/2, \quad (A19)$$

$$z_{m,k}=(z_m+z_k)/2, \quad (A20)$$

$$\Delta z_{m,k}=(z_m-z_k)/2, \quad (A21)$$

$$A_{m,k}=\chi(t_{r,m};t_{s,m};m)^2-\chi(t_{r,k};t_{s,k};k)^2, \quad (A22)$$

$$B_{m,k}=2[\chi(t_{r,m};t_{s,m};m)-\chi(t_{r,k};t_{s,k};k)]. \quad (A23)$$

The spatial coordinates (x,y,z) used here are part of a Cartesian coordinate syste. However, three linearly independent spatial coordinates from any other reasonable three-dimensional coordinate system may also be used here.

Equation (A12) provides M−1 linear relations between the location and clock offset variables $x-x_{1,m},y-y_{1,m},z-z_{1,m}$ and b in terms of the known or measurable time-dependent parameters $\Delta x_{1,m},\Delta y_{1,m}$ and $\Delta z_{1,m}$ and the predictable or computable time-dependent parameters $A_{1,m}$ and $B_{1,m}$.

Assume that M=4 LD signal sources are visible initially from the user station 11 and that these four LD signal sources do not lie in a common plane. This can be implemented by choosing the four LD signal sources with the best (lowest) Position Dilution of Precision (PDOP) parameter, as discussed in Leick, op cit, pages 253–255. The three equations (A11) for m=2, 3 and 4 can be restated in matrix form as $$\begin{bmatrix} \Delta x_{1,2} & \Delta y_{1,2} & \Delta z_{1,2} \\ \Delta x_{1,3} & \Delta y_{1,3} & \Delta z_{1,3} \\ \Delta x_{1,4} & \Delta y_{1,4} & \Delta z_{1,4} \end{bmatrix} \begin{bmatrix} x \\ y \\ z \end{bmatrix} = \begin{bmatrix} A'_{1,2}-B_{1,2} & b \\ A'_{1,3}-B_{1,3} & b \\ A'_{1,4}-B_{1,4} & b \end{bmatrix}, \quad (A24)$$

$$A'_{1,m}=A_{1,m}+(\Delta x_{1,m})(x_{1,m})+(\Delta y_{1,m})(y_{1,m})+(\Delta z_{1,m})(z_{1,m}) \quad (A25)$$

$$(m=2,3,4)$$

The 3×3 matrix and the 3×1 matrix on the left hand side of Eq. (A24) are written as H and $$R = \begin{bmatrix} x \\ y \\ z \end{bmatrix}, \quad (A26)$$

respectively, and the 3×1 matrix on the right hand side of Eq. (A24) is written as $$A' - Bb = \begin{bmatrix} A'_{1,2} - B_{1,2} & b \\ A'_{1,3} - B_{1,3} & b \\ A'_{1,4} - B_{1,4} & b \end{bmatrix}. \quad (A27)$$

If the four LD signal sources do not lie on a common plane, the matrix H is invertible, and Eq. (A24) can be inverted to yield $$R = H'(A' - Bb), \quad (A28)$$

$$H' = H^{-1}, \quad (A29)$$

so that x, y and z are known linear functions of the fourth variable b.

The magnitude of the determinant of the 3×3 matrix H in Eq. (A24) is the spatial volume of a tetrahedron whose vertices have the coordinates (0,0,0), $(\Delta x_{1,2}, \Delta y_{1,2}, \Delta z_{1,2})$, $(\Delta x_{1,3}, \Delta y_{1,3}, \Delta z_{1,3})$ and $(\Delta x_{1,4}, \Delta y_{1,4}, \Delta z_{1,4})$, and is also proportional to the PDOP parameter that can be used to evaluate the probable accuracy of location determination analysis using LD signal sources located at points with coordinates $(x_1,y_1,z_1)$, $(x_2,y_2,z_2)$, $(x_3,y_3,z_3)$, and $(x_4,y_4,z_4)$.

The fourth defining equation is obtained by squaring Eq. (A4-1') or any of the Equations (A4-m'), which yields a quadratic equation in the unknown clock offset b (or in one of the spatial coordinates x, y or z), namely $$[H'_{11}A'_{1,2} + H'_{12}A'_{1,3} + H'_{13}A'_{1,4} - x_{1,2} - \Delta x_{1,2} - \quad (A30)$$
$$(H'_{11}B_{1,2} + H'_{12}B_{1,3} + H'_{13}B'_{1,4})b]^2 +$$
$$[H'_{21}A'_{1,2} + H'_{22}A'_{1,3} + H'_{23}A'_{1,4} - y_{1,2} - \Delta y_{1,2} -$$
$$(H'_{21}B_{1,2} + H'_{22}B1,3 + H'_{23}B_{1,4})b]^2 +$$
$$[H'_{31}A'_{1,2} + H'_{32}A'_{1,3} + H'_{33}A'_{1,4} - z_{1,2} - \Delta z_{1,2} -$$
$$(H'_{31}B_{1,2} + H'_{32}B_{1,3} + H'_{33}B_{1,4})b]^2 = [b - \chi(t_{r,1};t_{s,1};1)]^2,$$

where $H'_{ij}$ is the entry in the matrix $H' = H^{-1}$ in the ith row and jth column.

Equation (A30) may be rewritten as $$Eb^2 + 2Fb + G = 0, \quad (A31)$$

$$E = \sum_{i=1}^{3} \left[ \sum_{j=1}^{3} H'_{ij}B_{1,j+1} \right]^2 - 1, \quad (A32)$$

$$F = -\sum_{i=1}^{3} \left[ \sum_{j=1}^{3} H'_{ij}B_{1,j+1} \right] \left[ \sum_{k=1}^{3} H'_{ik}A'_{1,k+1} - C_{i+1} \right] + \quad (A33)$$
$$\chi(t_{r,1};t_{s,1};1),$$

$$G = \sum_{i=1}^{3} \left[ \sum_{j=1}^{3} H'_{ij}A'_{1,j+1} - C_{i+1} \right]^2 - \chi(t_{r,1};t_{s,1};1)^2, \quad (A34)$$

$$C_2 = x_{12} + \Delta x_{12}, \quad (A35)$$

$$C_3 = y_{12} + \Delta y_{12}, \quad (A36)$$

$$C_4 = z_{12} + \Delta z_{12}, \quad (A37)$$

$$b = [-F \pm [F^2 - EG]^{1/2}]/E. \quad (A38)$$

This last quadratic equation in b has two solutions, one of which is consistent with the physical or geometrical constraints on b (|b| small). The total solution set includes the M−1=3 linear equations set forth in Eq. (A28) plus Eq. (A38), which involves computation of a single square root of a computed number. This is an improvement on the original set of defining relations, Equnations (A1) for m=1, 2, 3, 4, each of which requires computation of a square root and iterated computations to determine the solution coordinate set. Although the quadratic equation (A31) has been developed in terms of the location fix coordinate b, a similar quadratic equation can be developed in terms of any of the other location fix coordinates x, y or z.

The above-discussed procedure for obtaining exact solutions for the location fix coordinates x, y, z and/or b from Eqs. (A1) or (A3) can be used to construct a nonlinear transformation T that is applied to two, three or four pseudorange values PR(t;jm) (m=1, 2, 3, 4) to provide J location fix coordinates, in an exact, one-pass, no-iteration computation (J=2, 3, 4). If LD signals from M=J location determination signal sources are used to determine J location fix coordinates (J=2, 3, 4), the transformation T is exact and invertible. If M≧5, T may be exact and invertible, with additional information or solution constraints provided.

The analysis leading to Eq. (A30) uses only Eq. (A4-1) (or Eq. (A-4-m)) to obtain a quadratic equation in a location fix coordinate, such as the clock offset variable b, and Eq. (A4-1) is used to obtain each of the linear relations (A12). Another approach, which treats all of the relations (A4-m') more symmetrically, squares Eq. (A4-k') and subtracts this from the square of Eq. (4-m') (m≠k; m, k=1, 2, ..., M) to produce the general linear relation $$\Delta x_{m,k}(x - x_{m,k}) + \Delta y_{m,k}(y - y_{m,k}) + \Delta z_{m,k}(z - z_{m,k}) = A_{m,k} - B_{m,k}b, \quad (A39)$$

$$A_{m,k} = \chi(t_{r,m};t_{s,m};m)^2 - \chi(t_{r,k};t_{s,k};k)^2, \quad (A40)$$

$$B_{m,k} = 2[\chi(t_{r,m};t_{s,m};m) - \chi(t_{r,k};t_{s,k};k)]. \quad (A41)$$

The analog of Eq. (A24) is then expressed more symmetrically as $$\begin{bmatrix} \Delta X_{1,2;3,4} & \Delta Y_{1,2;3,4} & \Delta Z_{1,2;3,4} \\ \Delta X_{2,3;4,1} & \Delta Y_{2,3;4,1} & \Delta Z_{2,3;4,1} \\ \Delta X_{1,3;2,4} & \Delta Y_{1,3;2,4} & \Delta Z_{1,3;2,4} \end{bmatrix} \begin{bmatrix} x \\ y \\ z \end{bmatrix} = \begin{bmatrix} A_{1,2;3,4} - B_{1,2;3,4} & b \\ A_{2,3;4,1} - B_{2,3;4,1} & b \\ A_{1,3;2,4} - B_{1,3;2,4} & b \end{bmatrix}, \quad (A42)$$

$$\Delta X_{i,j;k,l} = \Delta x_{i,j} - \Delta x_{k,l}, \quad (A43)$$

$$\Delta Y_{i,j;k,l} = \Delta y_{i,j} - \Delta y_{k,l}, \quad (A44)$$

$$\Delta Z_{i,j;k,l} = \Delta z_{i,j} - \Delta z_{k,l}, \quad (A45)$$

$$A_{i,j;k,l} = A_{i,j} - A_{k,l} + (\Delta x_{i,j})(x_{i,j}) + (\Delta y_{i,j})(y_{i,j}) + (\Delta z_{i,j})(z_{i,j}) - \quad (A46)$$
$$(\Delta x_{k,l})(x_{k,l}) + (\Delta y_{k,l})(y_{k,l}) + (\Delta z_{k,l})(z_{k,l}),$$

$$B_{i,j;k,l} = B_{i,j} - B_{k,l}. \quad (A47)$$

The inverse of the 3×3 matrix on the left in Eq. (A42) can be shown to exist and is denoted H", and the 3×1 matrix on the right in Eq. (A42) is denoted as A"−B" b, where A" and B" are independent of the clock offset value b. Equation (A42) is then inverted to produce the more symmetrical solutions $$R = \begin{bmatrix} x \\ y \\ z \end{bmatrix} = H''(A'' - B''b). \quad (A48)$$

The inverses of the 3×3 matrices on the left side in Eqs. (A24) and (A42) are easily determined using known algebraic rules for inverses. For example, $$(H')ij = (-1)^{i+j} \text{cof}(H_{ji})/\text{det}(H) \ (i, j=1, 2, 3), \quad (A49)$$

where $\text{cof}(H_{ji})$ is the cofactor of the element $H_{ji}$ in the determinant of H.

A symmetric version of Eq. (A30) or (A31) is obtained by squaring each of Eqs. (A4-m) (m=1, ..., M) and adding these relations to produce a new quadratic equation in b, which is written as $$E'b^2 + 2F'b + G' = 0, \tag{A50}$$

$$E' = N^2 - N \sum_{k=1}^{3} ((HB)_k)^2, \tag{A51}$$

$$F' = -2 \sum_{m=1}^{4} \chi_m + 2N \sum_{k=1}^{3} (HB)_k (HA)_k - 2 \left( \sum_{m=1}^{3} x_m \right) (HB)_1 - \tag{A52}$$

$$2 \left( \sum_{m=1}^{3} y_m \right) (HB)_2 - 2 \left( \sum_{m=1}^{3} z_m \right) (HB)_3,$$

$$G' = \sum_{m=1}^{4} \chi_m^2 - N \sum_{k=1}^{3} ((HA)_k)^2 + 2 \left( \sum_{m=1}^{4} x_m \right) (HA)_1 + \tag{A53}$$

$$2 \left( \sum_{m=1}^{4} y_m \right) (HA)_2 + 2 \left( \sum_{m=1}^{4} z_m \right) (HA)_3,$$

$$(HA)_k = H''_{k1} A''_{1,2;3,4} + H''_{k2} A''_{2,3;4,1} + H''_{k3} A''_{1,3;2,4}, \tag{A54}$$

$$(k = 1, 2, 3),$$

$$(HB)_k = H''_{k1} B''_{1,2;3,4} + H''_{k2} B''_{2,3;4,1} + H''_{k3} B''_{1,3;2,4}, \tag{A55}$$

$$(k = 1, 2, 3),$$

$$\chi_m = \chi(t_{r,m}; t_{s,m}; m) - \chi(t_{r,k}; t_{s,k}; k), \tag{A56}$$

where $H''_{ij}$ is the entry in the ith row and jth column of the matrix $H''$ and all other quantities are defined above. Equation (A49) has two (real) solutions, $$b = \{-F' \pm [F'^2 - E'G']^{1/2}\}/E'. \tag{A57}$$

one of which is consistent with the practical constraints (|b| is relatively small). Once the clock offset value b (or another location fix coordinate) is determined, the remaining location fix coordinates are found from Eq. (A48).

Now consider the case where $M \geq 5$ LD signal sources are available. Equation (A24) (or Eq. (A42)) is written as $$HR = A' - B \, b, \tag{A58}$$

where H is an $(M-1) \times 3$ (non-square) matrix, R and A' and B are $(M-1) \times 1$ column matrices, and $M - 1 \geq 4$. One can form the $3 \times (M-1)$ Hermitean adjoint, denoted $H^+$, of the matrix H and apply the matrix $(H+H)^{-1}H^+$ to Eq. (A58) to formally produce the relation $$(H^+H)^{-1}H^+HR = R = (H^+H)^{-1} H^+(A' - B \, b). \tag{A59}$$

Equation (A59) represents an overdetermined group of equations, and any formal solution of Eq. (A58) is likely to be restricted to a subspace solution, which satisfies some but not all of the M relations in Eq. (A58). The rank of the matrix $H^+H$ may be less than 3, in which case the inverse of this matrix does not exist.

Because Eq. (A58) represents an over-determined set of equations, one can seek an approximate $4 \times 1$ solution vector S' given by $S'^{tr} = (x', y', z', b')$ that is "as close as possible" to the true solution vector $S^{tr} = (x, y, z, b)$ in some least mean square sense, by choosing solution vector components $x'$, $y'$, $z'$ and $b'$ that minimize an error parameter. For example, if Eq. (A24) is utilized, the error sum might be $$\epsilon = w_1 [H_{11}x' + H_{12}y' + H_{13}z' - A'_{12} - B_{12}b]^2 + \tag{A60}$$

$$w_2 [H_{21}x' + H_{22}y' + H_{23}z' - A'_{13} - B_{13}b]^2 +$$

$$w_3 [H_{31}x' + H_{32}y' + H_{33}z' - A'_{14} - B_{14}b]^2 + \ldots +$$

$$w_{M-1}[H_{M-1,1}x' + H_{M-1,2}y' + H_{M1,3}z' -$$

-continued
$$A'_{1,M} - B_{1,M}b]^2 - w_M[\chi(t_{r,1}; t_{s,1}; 1) - b]^2,$$

where $w_1, w_2, w_3, \ldots, w_M$ are selected non-negative weight coefficients and the coefficients $A'_{1,i}$ and $B_{1,i}(i=2, 3, \ldots, M)$ are the row components of the A' and B matrices in Eq. (A58). One can, of course, use uniform weight coefficients ($w_1 = w_2 = \ldots w_M$). Another suitable weight coefficient scheme allows the weight coefficients to depend (for example, inversely) on the PDOP, HDOP and/or VDOP parameters associated with different four-satellite constellations from among the M satellites ($M \geq 5$).

The situation where $M \geq 5$ LD signal sources are available can also be analyzed as $(\,) = M!/(4!)(M-4)!$ separate subsystems of 4 distinct LD signal sources drawn from a larger group of such sources, and a region of uncertainty for the present location of the LD signal antenna 13 can be estimated. Assume that no four of the LD antenna locations $L_k$ are coplanar. The situation $M=5$ is first examined for purposes of illustration. Five subsystems, numbered $k=1, 2, 3, 4, 5$, each including four of the LD signal sources, with LD signal source no. k being deleted in subsystem no. k, are analyzed according to the preceding discussion for $M=4$. An embodiment of the invention provides explicit location coordinates, written ($x_{a,k}, y_{a,k}, z_{a,k}$) or $L_k$, for the LD signal antenna location for subsystem no. k.

Given any four of these five locations $L_k$, such as $L_1$, $L_2$, $L_3$ and $L_4$ (subsystem 5), a unique sphere $S_{1,2,3,4}$ can be found that passes through these four locations, and the location coordinates ($x_0, y_0, z_0$)$_{1,2,3,4}$ of the center of this sphere are easily found. The sphere center satisfies the relations $$(x_{a,k} - x_0)^2 + (y_{a,k} - y_0)^2 + (z_{a,k} - z_0)^2 = r^2 (k=1,2,3,4), \tag{A61}$$

where $r = r(1,2,3,4)$ is the as-yet-undetermined radius of the sphere $S_{1,2,3,4}$. Subtracting Eq.(A61) for each of $k=2, 3$ and 4 from Eq. (A61) for $k=1$, the resulting three equations can be rearranged in matrix form as $$\begin{bmatrix} x_{a,1} - x_{a,2} & y_{a,1} - y_{a,2} & z_{a,1} - z_{a,2} \\ x_{a,1} - x_{a,3} & y_{a,1} - y_{a,3} & z_{a,1} - z_{a,3} \\ x_{a,1} - x_{a,4} & y_{a,1} - y_{a,4} & z_{a,1} - z_{a,4} \end{bmatrix} \begin{bmatrix} x_0 \\ y_0 \\ z_0 \end{bmatrix} = \begin{bmatrix} (r_1^2 - r_2^2)/2 \\ (r_1^2 - r_3^2)/2 \\ (r_1^2 - r_4^2)/2 \end{bmatrix}, \tag{A62}$$

$$r_k^2 = x_{a,k}^2 + y_{a,k}^2 + z_{a,k}^2 \quad (k = 1, 2, 3, 4). \tag{A63}$$

Equation (A62) can be written in matrix form as $$H(1,2,3,4) \, X_0(1,2,3,4) = D(1,2,3,4), \tag{A64}$$

where H is the $3 \times 3$ matrix on the left, $X_0 = [x_0 y_0 z_0]^{tr}$ is the $3 \times 1$ column matrix on the left and D is the $3 \times 1$ column matrix on the right in Eq. (A62) for the four locations $L_1, L_2, L_3$ and $L_4$. The matrix $H(1,2,3,4)$ has a nonzero determinant, and is thus invertible, because the four locations $L_k (k=1, 2, 3, 4)$ are not coplanar. The location coordinates for the sphere center are then expressed in the form $$X_0(1,2,3,4) = \begin{bmatrix} x_0 \\ y_0 \\ z_0 \end{bmatrix} = H(1,2,3,4)^{-1} D(1,2,3,4). \tag{A65}$$

The sphere radius squared, $r(1,2,3,4)^2$, is then obtained from Eq. (A61) for any of the equations with $k=1, 2, 3$ or 4. FIG. 4 illustrates a spherical solution obtained according to the preceding analysis.

The determinant of the matrix $H(1,2,3,4)$, or, equivalently, the determinant of the $3 \times 3$ matrix on the left in Eq. (A24), is proportional to the PDOP parameter for a satellite-based LD system. The PDOP parameter is sometimes defined as is the inverse ratio of the tetrahedral volume defined by the four points with coordinates $(x_m,y_m,z_m)$ (m=1,2,3,4) divided by the maximum tetrahedral for four points lying on a hemisphere, centered at the Earth's center and having a radius equal to the common radius of the satellite orbits from the Earth's center. The magnitude of the determinant of H(1,2,3,4) is the denominator volume for the PDOP parameter.

Returning to a general LD system, one computes the square of the distance of the location $L_5$ from the sphere center, viz.

$$r_{0,5}{}^2 = (x_{a,5-x0})^2 + (y_{a,5-y0})^2 + (z_{a,5-z0})^2, \qquad (A66)$$

and inquires whether $$r_{0,5}{}^2 \leq r(1,2,3,4)^2, \qquad (A67)$$

is satisfied. If the answer to this inquiry is "yes," the location $L_5$ lies on the surface of or within the sphere $S_{1,2,3,4}$, and the pair $$P_{1,2,3,4} = (X_0(1,2,3,4), r(1,2,3,4)) \qquad (A68)$$

is added to a set Π. If the inequality in Eq. (A67) is not satisfied, the pair $(X_0(1,2,3,4), r(1,2,3,4))$ is discarded.

The computations in the preceding paragraph are repeated for each of the other sets of four locations, namely $\{L_1, L_2, L_3, L_5\}, \{L_1, L_2, L_4, L_5\}, \{L_1, L_3, L_4, L_5\}$, and $\{L_2, L_3, L_4, L_5\}$, and the corresponding radius r and location coordinates $(x_0, y_0, z_0)$ for each of the respective spheres $S_{1,2,3,5}$, $S_{1,2,4,5}$, $S_{1,3,4,5}$, and $S_{2,3,4,5}$ are determined as in the preceding paragraph. Again one inquires if any of the inequalities $$r_{0,4}{}^2 = (X_{a,4}-x_0)^2 + (y_{a,4}-y_0)^2 + (Z_{a,4}-z_0)^2 \leq r(1,2,3,5)^2, \qquad (A67')$$

$$r_{0,3}{}^2 = (x_{a,3}-x_0)^2 + (y_{a,3}-y_0)^2 + (Z_{a,3}-z_0)^2 \leq r(1,2,4,5)^2, \qquad (A67'')$$

$$r_{0,2}{}^2 = (x_{a,2}-x_0)^2 + (y_{a,2}-y_0)^2 + (z_{a,2}-z_0)^2 \leq r(1,3,4,5)^2, \qquad (A67''')$$

$$r_{0,1}{}^2 = (x_{a,1}-x_0)^2 + (y_{a,1}-y_0)^2 + (z_{a,1}-z_0)^2 \leq r(2,3,4,5)^2, \qquad (A67'''')$$

is satisfied? If one of the preceding inequalities is satisfied, the corresponding pair $$P_{1,2,3,5} = (X_0(1,2,3,5), r(1,2,3,5)), \qquad (A68')$$

$$P_{1,2,4,5} = (X_0(1,2,4,5), r(1,2,4,5)), \qquad (A68'')$$

$$P_{1,3,4,5} = (X_0(1,3,4,5), r(1,3,4,5)), \text{ and/or} \qquad (A68''')$$

$$P_{2,3,4,5} = (X_0(2,3,4,5), r(2,3,4,5)), \qquad (A68'''')$$

is placed in the set Π. Otherwise, the corresponding pair is discarded. After all five sets of four locations $\{L_1, L_2, L_3, L_5\}, \{L_1, L_2, L_3, L_5\}, \{L_1, L_2, L_4, L_5\}, \{L_1, L_3, L_4, L_5\}$, and $\{L_2, L_3, L_4, L_5\}$, have been analyzed in this manner, the set Π contains at least one pair. Define $$r_{min} = r(a,b,c,d) = \min_{(X_0(h,i,j,k), r(h,i,j,k)) \in \Pi} \{r(h,i,j,k)\}. \qquad (A69)$$

The region of uncertainty of the location of the LD signal antenna 13 is then the sphere $S_{a,b,c,d}$, centered at $X_0(a,b,c,d)$, with radius r(a,b,c,d), and $X_0(a,b,c,d)$ can be designated as the location of the LD signal antenna 13 in this embodiment. The sphere $S_{a,b,c,d}$ and its radius $r_{min}=r(a,b,c,d)$ can also be determined by seeking the smallest sphere radius for which that sphere contains all the locations $L_1, L_2, L_3, L_4$ and $L_5$. This analysis is easily extended to M LD signal sources with $M \geq 5$, where the number of sets of locations $L_k$ taken four at a time is $\binom{M}{4} = M!/(4!)(M-4)!$.

In another approach for the situation M=5, the spatial location coordinates for the user are taken to be $(x_0,y_0,z_0)$, with an associated distance uncertainty of $r_{min}$, where the coordinates $(x_0,y_0,z_0)$ are determined in Eq. (64) and the uncertainty radius $r_{min}$ is determined in Eq. (A69).

In another approach for the situation M=5, a group of four location fix coordinates (x,y,z,b) is interpreted as coordinates in a four-dimensional Cartesian space. Each location fix coordinate set $(X_{a,k},y_{a,k},z_{a,k},b_{a,k})$ (k=1, 2,3,4,5) is now interpretable as a "point" in 4-space, and it is assumed that these five points do not lie in a co-hyperplane; that is, no non-zero set of five numbers $F_k$(k=1,2,3,4,5) can be found for which the relations $$\sum_{k=1}^{5} F_k x_{a,k} = \sum_{k=1}^{5} F_k y_{a,k} = \sum_{k=1}^{5} F_k z_{a,k} = \sum_{k=1}^{5} F_k b_{a,k} = 0. \qquad (A70)$$

are simultaneously satisfied.

For any set of five-four-dimensional coordinates in 4-space that are not co-hyperplanar, a sphere $S_{1,2,3,4,5}$ can be found that includes the "points" corresponding to these location sets on the sphere surface. If the center of the sphere $S_{1,2,3,4,5}$ has coordinates $(x_0,y_0,z_0,b_0)$ and a radius r(1,2,3,4,5) in 4-space (not yet known), the location fix coordinates $(x_{a,k},y_{a,k},z_{a,k},s_{ak})$ satisfy the constraints $$(x_{a,k}-x_0)^2 + (y_{a,k}-y_0)^2 + (z_{a,k}-z_0)^2 + (b_{a,k}-s0)^2 = r(1,2,3,4,5)^2 (k=1,2,3,4,5). \qquad (A71)$$

Proceeding by analogy with the development of Eqs. (A62)–(A64), by subtracting Eq. (A71) for k=2, 3, 4 and 5 from Eq. (A71) for k=1, one obtains the following relations $$\begin{bmatrix} x_{a,1}-x_{a,2} & y_{a,1}-y_{a,2} & z_{a,1}-z_{a,2} & b_{a,1}-s_{a,2} \\ x_{a,1}-x_{a,3} & y_{a,1}-y_{a,3} & z_{a,1}-z_{a,3} & b_{a,1}-s_{a,3} \\ x_{a,1}-x_{a,4} & y_{a,1}-y_{a,4} & z_{a,1}-z_{a,4} & b_{a,1}-s_{a,4} \\ x_{a,1}-x_{a,5} & y_{a,1}-y_{a,5} & z_{a,1}-z_{a,5} & b_{a,1}-s_{a,5} \end{bmatrix} \begin{bmatrix} x_0 \\ y_0 \\ z_0 \\ b_0 \end{bmatrix} = \begin{bmatrix} (r_1^2-r_2^2)/2 \\ (r_1^2-r_3^2)/2 \\ (r_1^2-r_3^2)/2 \\ (r_1^2-r_5^2)/2 \end{bmatrix} \qquad (A72)$$

where $$r_k{}^2 = x_{a,k}{}^2 + y_{a,k}{}^2 + z_{a,k}{}^2 + b_{a,k}{}^2 (k=1, 2, 3, 4, 5). \qquad (A73)$$

Equation (71) can be written in matrix form as $$H(1,2,3,4,5)X_0(1,2,3,4,5) = D(1,2,3,4,5), \qquad (A74)$$

where M(1,2,3,4,5) is the 4×4 matrix on the left, $X_0(1,2,3,4,5) = [x_0 y_0 z_0 b_0]^{tr}$ is the 4×1 column matrix on the left and D(1,2,3,4,5) is the 4×1 column matrix on the right in Eq. (A72) for the five locations $L_1, L_2, L_3, L_4$ and $L_5$. The matrix H(1,2,3,4,5) has a nonzero determinant, and is thus invertible, because the four locations $L_k$(k=1, 2, 3, 4) are not co-hyperplanar. The location coordinates for the sphere center are then expressed in the form $$X_0(1,2,3,4,5) = \begin{bmatrix} x_0 \\ y_0 \\ z_0 \\ b_0 \end{bmatrix} = H(1,2,3,4,5)^{-1}D(1,2,3,4,5). \qquad (A75)$$

The sphere radius squared, $r(1,2,3,4,5)^2$, is then obtained from Eq. (A71) for any of the equations with k=1,2,3,4 or 5.

Where acceptable signals from M=5 satellites are received and the pseudoranges are measured, the location coordinates $(x_0, y_0, z_0, b_0)$ can be used for the location fix coordinates $(x,y,z,b)$ for the user location, with an associated uncertainty in 4-space equal to $r(1,2,3,4,5)$.

For a situation with $M \geq 6$ satellites, the preceding analysis for $M \geq 5$ satellites, working in 3-space with only the spatial location coordinates $(x,y,z)$, can be extended. For M=6 satellites, one begins with the solution $X_0(p,q,r,s,t)$ for the center of a sphere $S(p,q,r,s,t)$ that contains the five coordinate fix sets $(X_{a,k}, y_{a,k}, z_{a,k}, b_{a,k})$ (k=p,q,r,s,t) on its surface. Here, p,q,r,s, t and u represent the six numerals 1,2,3,4,5 and 6, in any order. The sphere radius $r(p,q,r,s,t)$ is then determined. One next determines whether the remaining coordinate fix set $(x_{a,k}, y_{a,k}, z_{a,k}, b_{a,k})$ with k=u lies within or on the surface of the sphere $S(p,q,r,s,t)$ or lies outside this sphere.

By allowing u to assume the integer values f=1,2,3,4,5 and 6, one obtains six spheres $S(p,q,r,s,t)$ and six associated radii $r(p,q,r,s,t)$. At least one of the six spheres contains a corresponding location fix coordinate set $(x_{a,u}, y_{a,u}, z_{a,u}, b_{a,u})$ Let $\Pi$ be the set of coordinate fix sets $(x_{a,k}, y_{a,k}, z_{a,k}, b_{a,k})$ (k=p,q,r,s,t;k≠u) for which the sphere $S(p,q,r,s,t)$ contains the coordinate fix set $(x_{a,u}, y_{a,u}, z_{a,u}, b_{a,u})$ For M ($\geq 6$) visible satellites present, the set $\Pi$ has at least one member and has at most ( ) members. Let $$r0 = \min_{(x_{a,k}, y_{a,k}, z_{a,k}, b_{a,k}) \in \Pi} \{r(p,q,r,s,t)\} = r(p\hat{},q\hat{},r\hat{},s\hat{},t\hat{}) \quad (A76)$$

be the minimum radius of all spheres $S(p,q,r,s,t)$ for which $(x_{a,k}, y_{a,k}, z_{a,k}, b_{a,k})$ belongs to $\Pi$. The sphere center $X_0(p\hat{}, q\hat{}, r\hat{}, s\hat{}, t\hat{})$ has four coordinates, which are taken to be the location fix coordinates of the user, with an associated uncertainty of $r(p\hat{}, q\hat{}, r\hat{}, s\hat{}, t\hat{})$. These considerations extend easily to $M \geq 6$ visible satellites and provide a method for determining the user location fix coordinates when more than five satellites provide acceptable signals.

After the solution coordinates $(x,y,z,b)$, or $(x,y,z,b,a)$ for time-varying clock offset, are determined for the LD signal antenna for a time approximately equal to $t = t_{r,m}$ (or to $t = \{t_{r,1} + \ldots + t_{r,M}\}/M$ ), these coordinates can be displayed numerically and/or graphically and/or audibly on a suitable display for use by a user of the LD station.

We claim:

1. A method for determining location fix coordinates with enhanced accuracy for a mobile user location determination station, the method comprising the steps of:

(1) receiving location determination (LD) signals from a selected constellation of J LD signal sources with known locations at a selected location, and measuring a pseudorange value associated with each of the J LD signals received at approximately a selected signal observation time, where J is an integer satisfying $J \geq 2$;

(2) computing location fix coordinate values for the selected observation time from the pseudorange values measured at the selected location, using an exact, invertible transformation between a set of J pseudorange values and a corresponding set of J location fix coordinates;

(3) forming a location fix signal that includes the J location fix coordinates for the selected location computed using the selected location pseudorange values, the signal observation time, and an indicium that represents the selected constellation of sources of LD signals whose pseudorange values are measured at the selected location, and transmitting the location fix signal to a selected LD signal processing station;

(4) receiving the location fix signal at the selected LD signal processing station, and computing pseudorange values for the selected location at the selected observation time from the information contained in the location fix signal;

(5) receiving LD signals from the selected constellation of LD signal sources at a reference station having a known location at approximately the selected observation time, and measuring a pseudorange value associated with an LD signal received from each of the LD signal sources in the selected constellation at the reference station;

(6) determining a pseudorange correction for each of the J pseudorange values measured at the reference station, based on the known locations of the LD signal sources and the known location of the reference station; and (7) computing a selected location corrected pseudorange value for the selected location at the selected LD signal processing station as a sum of a selected location pseudorange value, for an LD signal received at the selected location from an LD signal source, plus the reference station pseudorange correction for the LD signal received from the same LD signal source, for each of the J LD signal sources.

2. The method of claim 1, further comprising the step of selecting said LD system from the class of LD systems consisting of GPS, GLONASS and LORAN.

3. The method of claim 1, further comprising the step of computing corrected location fix coordinates for said selected location, using said selected location corrected pseudorange values and said exact, invertible transformation.

4. The method of claim 1, wherein said step of computing said location fix coordinates from said pseudorange values measured at said selected location comprises the steps of:

selecting said integer J=4; and selecting said exact, invertible transformation to provide exact solutions $(x(t), y(t), z(t), b(t))$ of pseudorange equations $$[(x(t)-xj(t))^2 + (y(t)-yj(t))^2 + (z(t)-zj(t))^2]^{1/2} + b(t) = PR(t;j;loc),$$

where $PR(t;j;loc)$ is a value including a measured pseudorange from said LD signal source number j(j=1,2,3,4) to said selected location, where x(t). y(t), z(t) and b(t) are location fix coordinates for said selected location, and where (xj(t), yj(t), zj(t)) are the location coordinates of said LD signal source number j, at approximately said observation time t.

5. The method of claim 1, wherein said step of computing said location fix coordinates from said pseudorange values measured at said selected location comprises the steps of:

selecting said integer J=3; and selecting said exact, invertible transformation to provide exact solutions $(x(t), y(t), z(t), b(t))$ of pseudorange equations $$[(x(t)-xj(t))^2 + (y(t)-yj(t))^2 + (z(t)-zj(t))^2]^{1/2} + b(t) = PR(t;j;loc),$$

where $PR(t;j;loc)$ is a value including a measured pseudorange from said LD signal source number j(j=1, 2, 3, 4) to said selected location, where x(t). y(t), z(t) and b(t) are location fix coordinates for said selected location, with b(t) known, and where (xj(t), yj(t), zj(t)) are the location coordinates of said LD signal source number j, at said approximately observation time t.

6. The method of claim 1, wherein said step of computing said location fix coordinates from said pseudorange values measured at said selected location comprises the steps of:

selecting said integer J=3; and selecting said exact, invertible transformation to provide exact solutions (x(t),y(t),z(t),b(t)) of pseudorange equations $$[(x(t)-xj(t))^2+(y(t)-yj(t))^2+(z(t)-zj(t))^2]^{1/2}+b(t)=PR(t;j;loc),$$

where PR(t;j;loc) is a value including a measured pseudorange from said LD signal source number j(j=1, 2, 3, 4) to said selected location, where x(t). y(t), z(t) and b(t) are location fix coordinates for said selected location, with z(t) known, and where (xj(t),yj(t),zj(t)) are the location coordinates of said LD signal source number j, at approximately said observation time t.

7. The method of claim 1, wherein said step of computing said location fix coordinates from said pseudorange values measured at said selected location comprises the steps of:

selecting said integer J=2; and selecting said exact, invertible transformation to provide exact solutions (x(t),y(t),z(t),b(t)) of said pseudorange equations $$[(x(t)-xj(t))^2+(y(t)-yj(t))^2+(Z(t)-zj(t))^2]^{1/2}+b(t)=PR(t;j;loc),$$

where PR(t;j;loc) is a value including a measured pseudorange from said LD signal source number j(j=1, 2, 3, 4) to said selected location, where x(t). y'(t), z(t) and b(t) are location fix coordinates for said selected location, with z(t) and b(t) known, and where (xj(t),yj(t),zj(t)) are the location coordinates of said LD signal source number j, at approximately said observation time t.

8. The method of claim 1, wherein said step of computing said location fix coordinates from said pseudorange values measured at said selected location comprises the steps of:

selecting said integer J=2; and selecting said exact, invertible transformation to provide exact solutions (x(t),y(t),z(t),b(t)) of pseudorange equations $$[(x(t)-xj(t))^2+(y(t)-yj(t))^2+(z(t)-zj(t))^2]^{1/2}+b(t)=PR(t;j;loc),$$

where PR(t;j;loc) is a value including a measured pseudorange from said LD signal source number j(j=1, 2, 3, 4) to said selected location, where x(t). y'(t), z(t) and b(t) are location fix coordinates for said selected location, with y(t) and z(t) known, and where (xj(t),yj(t),zj(t)) are the location coordinates of said LD signal source number j, at approximately said observation time t.

9. The method of claim 1, further comprising the steps of:

providing a supplemental data processor as said selected LD signal processing station; and providing for the supplemental data processor at least one of (1) said pseudorange value for said LD signal received at said reference station and (2) said reference station pseudorange correction for said LD signal received at said reference station.

10. The method of claim 1, further comprising the step of providing said reference station as said selected LD signal processing station.

11. A method for determining location fix coordinates with enhanced accuracy for a mobile user location determination station, the method comprising the steps of:

(1) receiving location determination (LD) signals from a selected constellation of J LD signal sources with known locations at a reference station having a known location, and measuring a pseudorange value associated with each of the J LD signals received at approximately a selected signal observation time, where J is an integer satisfying J≧2;

(2) computing location fix coordinate values for the selected observation time from the pseudorange values measured at the reference station, using an exact, invertible transformation between a set of J pseudorange values and a corresponding set of J location fix coordinates;

(3) forming a reference station location fix signal that includes at least one of (1) the J location fix coordinates for the reference station, computed using the reference station pseudorange values, and (2) differences between the J location fix coordinates for the reference station, computed using the reference station pseudorange values, and known values of the J location fix coordinates for the reference station, plus the signal observation time and an indicium that represents the selected constellation of sources of LD signals whose pseudorange values are measured at the reference station, and transmitting the location fix signal;

(4) receiving the reference station location fix signal at a selected location, and computing pseudorange values for the reference station at approximately the selected observation time from the information contained in the location fix signal;

(5) receiving LD signals from the selected constellation of LD signal sources at the selected location at approximately the selected observation time, and measuring a pseudorange value associated with an LD signal received at the selected location from each of the LD signal sources in the selected constellation;

(6) determining a pseudorange correction for each of the J pseudorange values measured at the reference station, based on the known locations of the LD signal sources and the known location of the reference station; and (7) computing a corrected pseudorange value for the selected location as a sum of a selected location pseudorange value, for an LD signal received at the selected location from an LD signal source, plus the reference station pseudorange correction for the LD signal received from the same LD signal source, for each of the J LD signal sources.

12. The method of claim 11, further comprising the step of selecting said LD system from the class of LD systems consisting of GPS, GLONASS and LORAN.

13. The method of claim 11, further comprising the step of computing corrected location fix coordinates for said selected location, using said selected location corrected pseudorange values and said exact, invertible transformation.

14. The method of claim 11, wherein said step of computing said location fix coordinates from said pseudorange values measured at said reference station comprises the steps of:

selecting said integer J=4; and selecting said exact, invertible transformation to provide exact solutions (x(t),y(t),z(t),b(t)) of pseudorange equations $$[(x(t)-xj(t))^2+(y(t)-yj(t))^2+(z(t)-zj(t))^2]^{1/2}+b(t)=PR(t;j;loc),$$

where PR(t;j;loc) is a value including a measured pseudorange from said LD signal source number j(j=1, 2, 3, 4) to said reference station, where x(t). y(t), z(t) and b(t) are location fix coordinates for said reference station, and where (xj(t),yj(t),zj(t)) are the location coordinates of said LD signal source number j, at approximately said observation time t.

15. The method of claim 11, wherein said step of computing said location fix coordinates from said pseudorange values measured at said reference station comprises the steps of:

selecting said integer J=3; and selecting said exact, invertible transformation to provide exact solutions (x(t),y(t),z(t),b(t)) of pseudorange equations $$[(x(t)-xj(t))^2+(y(t)-yj(t))^2+(z(t)-zj(t))^2]^{1/2}+b(t)=PR(t;j;loc),$$

where PR(t;j;loc) is a value including a measured pseudorange from said LD signal source number j(j=1, 2, 3, 4) to said reference station, where x(t). y(t), z(t) and b(t) are location fix coordinates for said reference station, with b(t) known, and where (xj(t),yj(t),zj(t)) are the location coordinates of said LD signal source number j, at said approximately observation time t.

16. The method of claim 11, wherein said step of computing said location fix coordinates from said pseudorange values measured at said reference station comprises the steps of:

selecting said integer J=3; and selecting said exact, invertible transformation to provide exact solutions (x(t),y(t),z(t),b(t)) of pseudorange equations $$[(x(t)-xj(t))^2+(y(t)-yj(t))^2+(z(t)-zj(t))^2]^{1/2}+b(t)=PR(t;j;loc),$$

where PR(t;j;loc) is a value including a measured pseudorange from said LD signal source number j(j=1, 2, 3, 4) to said reference station, where x(t). y(t), z(t) and b(t) are location fix coordinates for said reference station, with z(t) known, and where (xj(t),yj(t),zj(t)) are the location coordinates of said LD signal source number j, at approximately said observation time t.

17. The method of claim 11, wherein said step of computing said location fix coordinates from said pseudorange values measured at said reference station comprises the steps of:

selecting said integer J=2; and selecting said exact, invertible transformation to provide exact solutions (x(t),y(t),z(t),b(t)) of pseudorange equations $$[(x(t)-xj(t))^2+(y(t)-yj(t))^2+(z(t)-zj(t))^2]^{1/2}+b(t)=PR(t;j;loc),$$

where PR(t;j;loc) is a value including a measured pseudorange from said LD signal source number j(j=1, 2, 3, 4) to said reference station, where x(t). y'(t), z(t) and b(t) are location fix coordinates for said reference station, with z(t) and b(t) known, and where (xj(t),yj(t),zj(t)) are the location coordinates of said LD signal source number j, at approximately said observation time t.

18. The method of claim 11, wherein said step of computing said location fix coordinates from said pseudorange values measured at said reference station comprises the steps of:

selecting said integer J=2; and selecting said exact, invertible transformation to provide exact solutions (x(t),y(t),z(t),b(t)) of pseudorange equations $$[(x(t)-xj(t))^2+(y(t)-yj(t))^2+(z(t)-zj(t))^2]^{1/2}+b(t)=PR(t;j;loc),$$

where PR(t;j;loc) is a value including a measured pseudorange from said LD signal source number j(j=1, 2, 3, 4) to said reference station, where x(t). y'(t), z(t) and b(t) are location fix coordinates for said reference station, with y(t) and z(t) known, and where (xj(t),yj(t),zj(t)) are the location coordinates of said LD signal source number j, at approximately said observation time t.

19. A system for determining location fix coordinates with enhanced accuracy for a mobile user location determination station, the system comprising:

a first location determination (LD) station, including a first microprocessor that is programmed:

(1) to receive LD signals from a selected constellation of J LD signal sources with known locations at a selected location, and to measure a pseudorange value associated with each of the J LD signals received at approximately a selected signal observation time, where J is an integer satisfying J≧2;

(2) to compute location fix coordinate values for the selected observation time from the pseudorange values measured at the selected location, using an exact, invertible transformation between a set of J pseudorange values and a corresponding set of J location fix coordinates; and (3) to form a location fix signal that includes the J location fix coordinates for the selected location computed using the selected location pseudorange values, the signal observation time, and an indicium that represents the selected constellation of sources of LD signals whose pseudorange values are measured at the selected location;

a signal transmitter, connected to the first microprocessor, that transmits the location fix signal;

a signal receiver that receives the transmitted location fix signal; and a second LD station, having a known location and including a second microprocessor that is connected to the signal receiver and that is programmed:

(i) to receive the location fix signal at the selected LD signal processing station, and to compute pseudorange values for the selected location at the selected observation time from the information contained in the location fix signal;

(ii) to receive LD signals from the selected constellation of LD signal sources at approximately the selected observation time, and to measure a pseudorange value associated with an LD signal received from each of the LD signal sources in the selected constellation at the second LD station;

(iii) to determine a pseudorange correction for each of the J pseudorange values measured at the reference station, based on the known locations of the LD signal sources and the known location of the second LD station; and (iv) to compute a selected location corrected pseudorange value for the selected location at the selected LD signal processing station as a sum of a selected location pseudorange value, for an LD signal received at the selected location from an LD signal source, plus the second LD station pseudorange correction for the LD signal received from the same LD signal source, for each of the LD signal sources.

20. A system for determining location fix coordinates with enhanced accuracy for a mobile user location determination station, the system comprising:

a first location determination (LD) station, having a known location and including a first microprocessor that is programmed:

(1) to receive location determination (LD) signals from a selected constellation of J LD signal sources with known locations, and to measure a pseudorange value associated with each of the J LD signals received at approximately a selected signal observation time, where J is an integer satisfying $J \geq 2$;

(2) to compute location fix coordinate values for the selected observation time from the pseudorange values measured at the first LD station, using an exact, invertible transformation between a set of J pseudorange values and a corresponding set of J location fix coordinates; and (3) to form a location fix signal that includes at least one of (1) the J location fix coordinates for the first LD station, computed using the first LD station pseudorange values, and (2) differences between the J location fix coordinates for the first LD station, computed using the first LD station pseudorange values, and known values of the J location fix coordinates for the first LD station, plus the signal observation time and an indicium that represents the selected constellation of sources of LD signals whose pseudorange values are measured at the first LD station:

a signal transmitter that transmits the location fix signal; transmitting the location fix signal;

a signal receiver that receives the location fix signal; and a second LD station, located at a selected location, and including a first microprocessor that is connected to the signal receiver and that is programmed:

(i) to receive the location fix signal and to compute pseudorange values for the second LD station at approximately the selected observation time from the information contained in the location fix signal;

(ii) to receive LD signals from the selected constellation of LD signal sources at the second LD station at approximately the selected observation time, and to measure a pseudorange value associated with an LD signal received at the second LD station from each of the LD signal sources in the selected constellation;

(iii) to determine a pseudorange correction for each of the J pseudorange values measured at the second LD station, based on the known locations of the LD signal sources and the known location of the first LD station; and (iv) to compute a corrected pseudorange value for the selected location as a sum of a selected location pseudorange value, for an LD signal received at the second LD station from an LD signal source, plus the reference station pseudorange correction for the LD signal received from the same LD signal source, for each of the LD signal sources.

* * * * *